US 6,667,001 B2

(12) United States Patent
Sullivan et al.

(10) Patent No.: US 6,667,001 B2
(45) Date of Patent: Dec. 23, 2003

(54) METHOD OF PRODUCING A MULTI-LAYER GOLF BALL

(75) Inventors: Michael J. Sullivan, Chicopee, MA (US); John Nealon, Springfield, MA (US); Mark Binette, Ludlow, MA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/783,484

(22) Filed: Feb. 14, 2001

(65) Prior Publication Data

US 2003/0207729 A1 Nov. 6, 2003

Related U.S. Application Data

(63) Continuation of application No. 09/040,456, filed on Mar. 18, 1998, now Pat. No. 6,213,894, which is a continuation-in-part of application No. 08/631,613, filed on Apr. 10, 1996, now Pat. No. 5,803,831, which is a continuation-in-part of application No. 08/591,046, filed on Jan. 25, 1999, now abandoned, and a continuation-in-part of application No. 08/542,793, filed on Oct. 13, 1995, now abandoned, which is a continuation-in-part of application No. 08/070,510, filed on Jun. 1, 1993, now abandoned.

(51) Int. Cl.[7] ................ B29C 45/14; B29C 65/02; B29C 43/20
(52) U.S. Cl. ............. 264/129; 264/248; 264/255; 264/275; 264/279.1; 264/325
(58) Field of Search ................ 264/129, 248, 264/255, 275, 279.1, 325

(56) References Cited

U.S. PATENT DOCUMENTS

| 4,683,257 | A |   | 7/1987  | Kakiuchi et al. |
|-----------|---|---|---------|------------------------|
| 4,959,000 | A | * | 9/1990  | Giza ............... 425/116 |
| 5,006,297 | A | * | 4/1991  | Brown et al. ....... 264/234 |
| 5,122,046 | A | * | 6/1992  | Lavallee et al. ..... 425/116 |
| 5,803,831 | A |   | 9/1998  | Sullivan et al. |
| 5,827,548 | A | * | 10/1998 | Lavallee et al. ..... 425/116 |
| 5,840,351 | A | * | 11/1998 | Inoue et al. ........ 425/556 |
| 5,849,237 | A | * | 12/1998 | Inoue ............... 264/319 |
| 5,882,567 | A | * | 3/1999  | Cavallaro et al. ... 264/255 |
| 5,885,172 | A |   | 3/1999  | Hebert et al. |
| 6,033,611 | A | * | 3/2000  | Yamaguchi ......... 264/250 |
| 6,036,907 | A | * | 3/2000  | Tanaka et al. ...... 264/250 |
| 6,042,768 | A | * | 3/2000  | Calabria et al. ..... 264/135 |
| 6,056,842 | A | * | 5/2000  | Dalton et al. ....... 156/243 |

* cited by examiner

Primary Examiner—Edmund H. Lee

(57) ABSTRACT

Disclosed herein is a multi-layer golf ball having a soft outer cover. The golf ball has an inner cover layer with a Shore D hardness of 60 or more, and an outer cover with a Shore D hardness of 55 or less, and more preferably 50 or less. In a particularly preferred form of the invention, the outer cover comprises at least 75% of a soft copolymer formed from a polyolefin, an unsaturated carboxylic acid, and a monomer of the acrylate ester class. The golf ball of the invention has exceptionally soft feel and high spin rates on short shots of 80 yards or less and, particularly, 40 yards or less, while maintaining good distance and average spin on full shots.

19 Claims, 1 Drawing Sheet

METHOD OF PRODUCING A MULTI-LAYER GOLF BALL

This application is a continuation of U.S. application Ser. No. 09/040,456 filed on Mar. 18, 1998, now U.S. Pat. No. 6,213,894, which in turn is a continuation-in-part of U.S. application Ser. No. 08/631,613 filed on Apr. 10, 1996, now U.S. Pat. No. 5,803,831, which in turn is a continuation-in-part of U.S. application Ser. No. 08/591,046 filed on Jan. 25, 1996, now abandoned, and U.S. application Ser. No. 08/542,793 filed Oct. 13, 1995, now abandoned, which in turn is a continuation-in-part of U.S. application Ser. No. 08/070,510 filed Jun. 1, 1993, now abandoned.

FIELD OF THE INVENTION

The present invention relates to golf balls and, more particularly, to improved golf balls comprising multi-layer covers which have a hard inner layer and a relatively soft outer layer.

BACKGROUND OF THE INVENTION

Traditional golf ball covers have been comprised of balata or blends of balata with elastomeric or plastic materials. The traditional balata covers are relatively soft and flexible. Upon impact, the soft balata covers compress against the surface of the club producing high spin. Consequently, the soft and flexible balata covers provide an experienced golfer with the ability to apply a spin to control the ball in flight in order to produce a draw or a fade, or a backspin which causes the ball to "bite" or stop abruptly on contact with the green. Moreover, the soft balata covers produce a soft "feel" to the low handicap player. Such playability properties (workability, feel, etc.) are particularly important in short iron play with low swing speeds and are exploited significantly by relatively skilled players.

Despite all the benefits of balata, balata covered golf balls are easily cut and/or damaged if mis-hit. Golf balls produced with balata or balata-containing cover compositions therefore have a relatively short lifespan.

As a result of this negative property, balata and its synthetic substitutes, transpolybutadiene and transpolyisoprene, have been essentially replaced as the cover materials of choice by new cover materials comprising ionomeric resins.

Ionomeric resins are polymers containing interchain ionic bonding. As a result of their toughness, durability and flight characteristics, various ionomeric resins sold by E.I. DuPont de Nemours & Company under the trademark "Surlyn®" and more recently, by the Exxon Corporation (see U.S. Pat. No. 4,911,451) under the trademarks "ESCOR®" and the trade name "Iotek", have become the materials of choice for the construction of golf ball covers over the traditional "balata" (transpolyisoprene, natural or synthetic) rubbers. As stated, the softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid, or maleic acid. Metal ions, such as sodium or zinc, are used to neutralize some portion of the acidic group in the copolymer resulting in a thermoplastic elastomer exhibiting enhanced properties, i.e. durability, etc., for golf ball cover construction over balata. However, some of the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight. Since the ionomeric resins are harder than balata, the ionomeric resin covers do not compress as much against the face of the club upon impact, thereby producing less spin. In addition, the harder and more durable ionomeric resins lack the "feel" characteristic associated with the softer balata related covers.

As a result, while there are currently more than fifty (50) commercial grades of ionomers available both from DuPont and Exxon, with a wide range of properties which vary according to the type and amount of metal cations, molecular weight, composition of the base resin (i.e., relative content of ethylene and methacrylic and/or acrylic acid groups) and additive ingredients such as reinforcement agents, etc., a great deal of research continues in order to develop a golf ball cover composition exhibiting not only the improved impact resistance and carrying distance properties produced by the "hard" ionomeric resins, but also the playability (i.e., "spin", "feel", etc.) characteristics previously associated with the "soft" balata covers, properties which are still desired by the more skilled golfer.

Consequently, a number of two-piece (a solid resilient center or core with a molded cover) and three-piece (a liquid or solid center, elastomeric winding about the center, and a molded cover) golf balls have been produced to address these needs. The different types of materials utilized to formulate the cores, covers, etc. of these balls dramatically alters the balls' overall characteristics. In addition, multi-layered covers containing one or more ionomer resins have also been formulated in an attempt to produce a golf ball having the overall distance, playability and durability characteristics desired.

This was addressed by Spalding & Evenflo companies, Inc., the assignee of the present invention, in U.S. Pat. No. 4,431,193 where a multi-layered golf ball is produced by initially molding a first cover layer on a spherical core and then adding a second layer. The first layer is comprised of a hard, high flexural modulus resinous material such as type 1605 Surlyn® (now designated Surlyn® 8940). Type 1605 Surlyn® (Surlyn® 8940) is a sodium ion based low acid (less than or equal to 15 weight percent methacrylic acid) ionomer resin having a flexural modulus of about 51,000 psi. An outer layer of a comparatively soft, low flexural modulus resinous material such as type 1855 Surlyn® (now designated Surlyn® 9020) is molded over the inner cover layer. Type 1855 Surlyn® (Surlyn® 9020) is a zinc ion based low acid (10 weight percent methacrylic acid) ionomer resin having a flexural modulus of about 14,000 psi.

The '193 patent teaches that the hard, high flexural modulus resin which comprises the first layer provides for a gain in coefficient of restitution over the coefficient of restitution of the core. The increase in the coefficient of restitution provides a ball which serves to attain or approach the maximum initial velocity limit of 255 feet per second as provided by the United States Golf Association (U.S.G.A.) rules. The relatively soft, low flexural modulus outer layer provides for the advantageous "feel" and playing characteristics of a balata covered golf ball.

In various attempts to produce a durable, high spin ionomer golf ball, the golfing industry has blended the hard ionomer resins with a number of softer ionomeric resins. U.S. Pat. Nos. 4,884,814 and 5,120,791 are directed to cover compositions containing blends of hard and soft ionomeric resins. The hard copolymers typically are made from an olefin and an unsaturated carboxylic acid. The soft copolymers are generally made from an olefin, an unsaturated carboxylic acid, and an acrylate ester. It has been found that golf ball covers formed from hard-soft ionomer blends tend to become scuffed more readily than covers made of hard ionomer alone. It would be useful to develop a golf ball having a combination of softness and durability which is better than the softness-durability combination of a golf ball cover made from a hard-soft ionomer blend.

Most professional golfers and good amateur golfers desire a golf ball that provides distance when hit off a driver, control and stopping ability on full iron shots, and high spin on short "touch and feel" shots. Many conventional two-piece and thread wound performance golf balls have undesirable high spin rates on full shots. The excessive spin on full shots is a sacrifice made in order to achieve more spin which is desired on the shorter touch shots. It would be beneficial to provide a golf ball which has high spin for touch shots without generating excessive spin on full shots.

SUMMARY OF THE INVENTION

An object of the invention is to provide a golf ball with a soft cover which has good scuff resistance.

Yet another object of the invention is to provide a golf ball having a favorable combination of spin rate and durability.

A further object of the invention is to provide a golf ball having a soft cover made from a cover material which is blended with minimal mixing difficulties.

Another object of the invention is to provide a method of making a golf ball which has a soft cover with good scuff resistance and cut resistance.

Another object of the invention is to provide a golf ball which has a high spin on shots of 250 feet or less and an average spin on full shots using a 9 iron. Yet another object of the invention is to provide a method of making a durable golf ball with a relatively high spin rate.

A further object of the invention is to provide a multi-layer golf ball having exceptionally soft feel and high spin rates on short shots while maintaining good distance on full shots.

Yet another object of the invention is to provide a multi-layer golf ball having a high spin rate on short shots and not having an excessive spin rate on long shots.

Other objects will be in part obvious and in part pointed out more in detail hereafter.

The invention in a preferred form is a golf ball, comprising: a core, a thermoplastic inner cover layer formed over the core, the inner cover layer having a Shore D hardness of at least 60 as measured on the surface thereof, and an outer cover layer formed over the inner cover layer, the outer cover layer having a Shore D hardness of no more than 53 as measured on the surface thereof, the golf ball having a PGA compression of 100 or less and a coefficent of restitution of at least 0.750.

The outer cover layer preferably has a Shore D hardness of no more than 50. The ball preferably has a PGA compression of 90 or less. In a particularly preferred form of the invention, the outer cover layer comprises a thermoplastic material. The inner cover layer preferably comprises at least one member selected from the group consisting of polyphenylene ether/ionomer blends, ionomers, polyamides, polyurethanes, polyester elastomers, polyester amides, metallocene catalyzed polyolefins and blends thereof. The inner cover layer preferably has a Shore D hardness of 60–85.

The outer cover layer preferably comprises at least one member consisting of polyphenylene ether/ionomer blends, ionomers, polyamides, polyurethanes, polyester elastomers, polyester amides, metallocene catalyzed polyolefins, and blends thereof. The outer cover layer preferably has a Shore D hardness of 30–53 and more preferably a Shore D hardness of 30–50.

The golf ball of the invention has a core which is a solid or is filled with liquid or gel. The core can be wound or non-wound. In one preferred form of the invention, at least one of the inner and outer cover layers has a thickness of 0.03–0.07 inches.

The outer cover layer preferably has a Shore D hardness of 45–53 as measured on the curved surface thereof. The inner cover layer preferably has a Shore D hardness of 60–85 as measured on the curved surface thereof.

In a particularly preferred form of the invention the outer cover layer comprises—resin, more than 75 wt % of the ionomeric resin consisting of one or more copolymers, each of which is formed from (a) an olefin having 2 to 8 carbon atoms, (b) an unsaturated monomer of the acrylate ester class having from 1 to 21 carbon atoms, and (c) an acid which includes at least one member selected from the group consisting of alpha, beta-ethylenically unsaturated mono- or dicarboxylic acids with a portion of the acid being neutralized with cations.

Another preferred form of the invention is a golf ball comprising: a core, an inner cover layer formed from a composition which includes at least 75 weight % of at least one material selected from the group consisting of polyphenylene ether/ionomer blends, ionomers, polyamides, polyurethanes, polyester elastomers, polyester amides, metallocene catalyzed polyolefins, and blends thereof, and an outer cover layer formed over the inner cover layer, the outer cover layer having a Shore D hardness of no more than 53 as measured on the curved surface thereof, the golf ball having a PGA compression of 100 or less and a coefficient of restitution of at least 0.750. The material preferably is a thermoset.

A further preferred form of the invention is a golf ball comprising: a core, an inner cover layer formed over the core, the inner cover layer having a Shore D hardness of at least 60 as measured on the curved surface thereof, and an outer cover layer formed over the inner cover layer, the outer cover layer having a flex modulus of 1,000–10,000 psi, the golf ball having a PGA compression of 100 or less and a coefficient of restitution of at least 0.750. The inner cover layer preferably comprises a thermoset polyurethane and/or a thermoset metallocene catalyzed polyolefin.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

Figure 1:
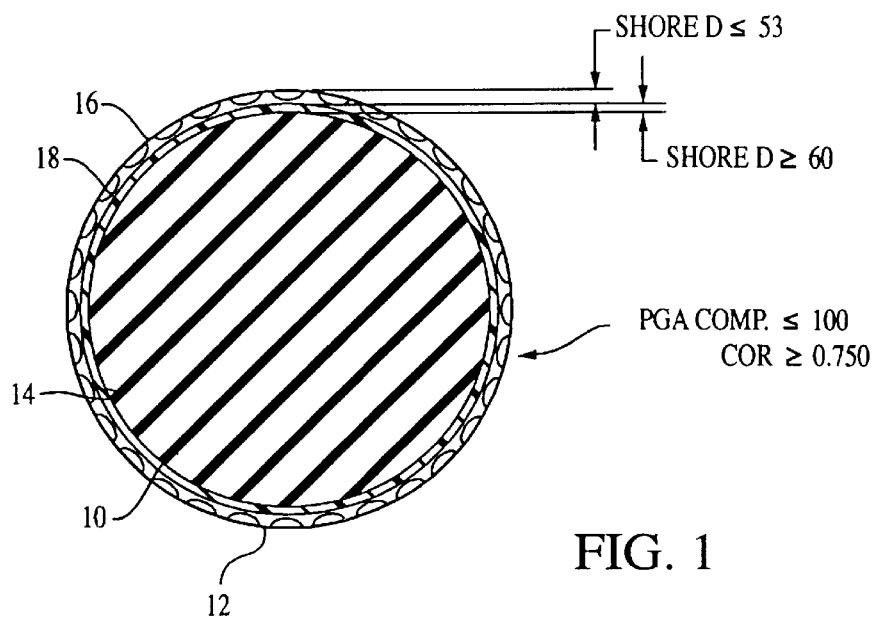
FIG. 1 is a cross-sectional view of a golf ball embodying the invention illustrating a core 10 and a cover 12 consisting of an inner layer 14 and an outer layer 16 having dimples 18.
Figure 2:
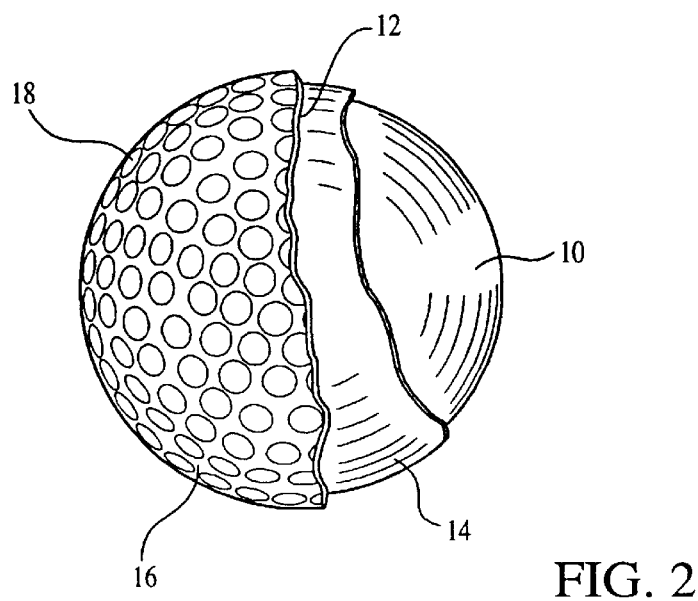
FIG. 2 is a diametrical cross-sectional view of a golf ball of the invention having a core 10 and a cover 12 made of an inner layer 14 and an outer layer 16 having dimples 18.

The present invention relates to improved multi-layer golf balls, particularly a golf ball comprising a multi-layered cover 12 over a solid core 10, and method for making same. The golf balls of the invention, which can be of a standard or enlarged size, have a unique combination of high coefficient of restitution and a high spin rate on short shots.

The core 10 of the golf ball can be formed of a solid, a liquid, or any other substance which will result in an inner ball, i.e. core and inner cover layer, having the desired COR, compression and hardness. The multi-layered cover 12 comprises two layers: a first or inner layer or ply 14 and a second or outer layer or ply 16. The inner layer 14 can be ionomer, ionomer blends, non-ionomer, non-ionomer blends, or blends of ionomer and non-ionomer. The outer layer 16 is softer than the inner layer and can be ionomer, ionomer blends, non-ionomer, non-ionomer blends or blends of ionomer and non-ionomer.

In a first preferred embodiment, the inner layer 14 is comprised of a high acid (i.e. greater than 16 weight percent acid) ionomer resin or high acid ionomer blend. Preferably, the inner layer is comprised of a blend of two or more high acid (i.e. at least 16 weight percent acid) ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost of production without affecting the overall performance of the finished golf ball. In a second embodiment, the inner layer 14 is comprised of a low acid (i.e. 16 weight percent acid or less) ionomer blend. Preferably, the inner layer is comprised of a blend of two or more low acid (i.e. 16 weight percent acid or less) ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost of production without affecting the overall performance of the finished golf ball.

It has been found that a hard inner layer provides for a substantial increase in resilience (i.e., enhanced distance) over known multi-layer covered balls. The softer outer layer provides for desirable "feel" and high spin rate while maintaining respectable resiliency. The soft outer layer allows the cover to deform more during impact and increases the area of contact between the club face and the cover, thereby imparting more spin on the ball. As a result, the soft cover provides the ball with a balata-like feel and playability characteristics with improved distance and durability. Consequently, the overall combination of the inner and outer cover layers results in a golf ball having enhanced resilience (improved travel distance) and durability (i.e. cut resistance, etc.) characteristics while maintaining and in many instances, improving the playability properties of the ball.

The combination of a hard inner cover layer with a soft, relatively low modulus ionomer, ionomer blend or other non-ionomeric thermoplastic elastomer outer cover layer provides for excellent overall coefficient of restitution (i.e., excellent resilience) because of the improved resiliency produced by the inner cover layer. While some improvement in resiliency is also produced by the outer cover layer, the outer cover layer generally provides for a more desirable feel and high spin, particularly at lower swing speeds with highly lofted clubs such as half wedge shots.

Inner Cover Layer

The inner cover layer is harder than the outer cover layer and generally has a thickness in the range of 0.01 to 0.15 inches, preferably 0.01–0.10 inches, more preferably 0.03 to 0.07 inches for a 1.68 inch ball and 0.05 to 0.10 inches for a 1.72 inch (or more) ball. The core and inner cover layer together form an inner ball having a coefficient of restitution of 0.780 or more and more preferably 0.790 or more, and a diameter in the range of 1.48–1.66 inches for a 1.68 inch ball and 1.50–1.70 inches for a 1.72 inch (or more) ball. The inner cover layer has a Shore D hardness of 60 or more. It is particularly advantageous if the golf balls of the invention have an inner layer with a Shore D hardness of 65 or more. The above-described characteristics of the inner cover layer provide an inner ball having a PGA compression of 100 or less. It is found that when the inner ball has a PGA compression of 90 or less, excellent playability results.

The inner layer compositions of the first and third embodiments include the high acid ionomers such as those developed by E.I. DuPont de Nemours & Company under the trademark "Surlyn®" and by Exxon Corporation under the trademark "Escor®" or tradename "Iotek", or blends thereof. Examples of compositions which may be used as the inner layer herein are set forth in detail in a continuation of U.S. Ser. No. 08/174,765, which is a continuation of U.S. Ser. No. 07/776,803 filed Oct. 15, 1991, and Ser. No. 08/493,089, which is a continuation of Ser. No. 07/981,751, which in turn is a continuation of Ser. No. 07/901,660 filed Jun. 19, 1992, incorporated herein by reference. Of course, the inner layer high acid ionomer compositions are not limited in any way to those compositions set forth in said copending applications.

The high acid ionomers which may be suitable for use in formulating the inner layer compositions of the subject first and third embodiments of the invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–100%, preferably 30–70%) by the metal ions. Each of the high acid ionomer resins which may be included in the inner layer cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Although the inner layer cover composition of the first and third embodiments of the invention preferably includes a high acid ionomeric resin and the scope of the patent embraces all known high acid ionomeric resins falling within the parameters set forth above, only a relatively limited number of these high acid ionomeric resins have recently become commercially available.

The high acid ionomeric resins available from Exxon under the designation "Escor®" and or "Iotek", are somewhat similar to the high acid ionomeric resins available under the "Surlyn®" trademark. However, since the Escor®/Iotek ionomeric resins are sodium or zinc salts of poly(ethylene-acrylic acid) and the "Surlyn®" resins are zinc, sodium, magnesium, etc. salts of poly(ethylene-methacrylic acid), distinct differences in properties exist.

Examples of the high acid methacrylic acid based ionomers found suitable for use in accordance with this invention include Surlyn® 8220 and 8240 (both formerly known as forms of Surlyn AD-8422), Surlyn® 9220 (zinc cation), Surlyn® SEP-503-1 (zinc cation), and Surlyn® SEP-503-2 (magnesium cation). According to DuPont, all of these ionomers contain from about 18.5 to about 21.5% by weight methacrylic acid.

More particularly, Surlyn® AD-8422 is currently commercially available from DuPont in a number of different grades (i.e., AD-8422-2, AD-8422-3, AD-8422-5, etc.) based upon differences in melt index According to DuPont, Surlyn® 8422, which is believed recently to have been redesignated as 8220 and 8240, offers the following general properties when compared to Surlyn® 8920, the stiffest, hardest of all on the low acid grades (referred to as "hard" ionomers in U.S. Pat. No. 4,884,814):

TABLE 1

|  | LOW ACID (15 wt % Acid) SURLYN® 8920 | HIGH ACID (>20 wt % Acid) | |
| --- | --- | --- | --- |
|  |  | SURLYN® 8422-2 | SURLYN® 8422-3 |
| IONOMER |  |  |  |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP$^1$, ° C. | 88 | 86 | 85 |
| FP$^1$, ° C. | 47 | 48.5 | 45 |
| COMPRESSION MOLDING$^2$ |  |  |  |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

$^1$DSC second beat, 10° C./min heating rate.
$^2$Samples compression molded at 150° C. annealed 24 hours at 60° C. 8422-2, -3 were homogenized at 190° C. before molding.

In comparing Surlyn® 8920 to Surlyn® 8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn® SEP-503-1 (zinc cation) and Surlyn® SEP-503-2 (magnesium cation) are high acid zinc and magnesium versions of the Surlyn® AD 8422 high acid ionomers. When compared to the Surlyn® AD 8422 high acid ionomers, the Surlyn SEP-503-1 and SEP-503-2 ionomers can be defined as follows:

| Surlyn® Ionomer | Ion | Melt Index | Neutralization % |
| --- | --- | --- | --- |
| AD 8422-3 | Na | 1.0 | 45 |
| SEP 503-1 | Zn | 0.8 | 38 |
| SEP 503-2 | Mg | 1.8 | 43 |

Furthermore, Surlyn® 8162 is a zinc cation ionomer resin containing approximately 20% by weight (i.e. 18.5–21.5% weight) methacrylic acid copolymer that has been 30–70% neutralized. Surlyn® 8162 is currently commercially available from DuPont.

Examples of the high acid acrylic acid based ionomers suitable for use in the present invention also include the Escor® or Iotek high acid ethylene acrylic acid ionomers produced by Exxon such as Ex 1001, 1002, 959, 960, 989, 990, 1003, 1004, 993, 994. In this regard, Escor® or Iotek 959 is a sodium ion neutralized ethylene-acrylic neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectively. The physical properties of these high acid acrylic acid based ionomers are as follows:

TABLE 2

| | Exxon High Acid Ionomers | | | | | |
| --- | --- | --- | --- | --- | --- | --- |
| Property | Ex 1001 | Ex 1002 | ESCOR® (IOTEK) 959 | Ex 1003 | Ex 1004 | ESCOR® (IOTEK) 960 |
| Melt index, g/10 min. | 1.0 | 1.6 | 2.1 | 1.1 | 2.0 | 1.8 |
| Cation | Na | Na | Na | Zn | Zn | Zn |
| Melting Point, ° C. | 83.7 | 83.7 | — | 82 | 82.5 | 79 |
| Vicat Softening Point, ° C. | 51.5 | 51.5 | 58 | 56 | 55 | 55 |
| Tensile @ Break | 34.4 MPa | 31.7 MPa | 34 MPa | 24.8 MPa | 20.6 MPa | 24 MPa |
| Elongation @ Break, % | 341 | 348 | 280 | 387 | 437 | 430 |
| Hardness, Shore D | 63 | 62 | 65 | 54 | 53 | 57 |
| Flexural Modulus | 365 MPa | 380 MPa | 480 MPa | 147 MPa | 130 MPa | 170 MPa |

TABLE 3

Additional Exxon High Acid Ionomers

| Property | Unit | EX 989 | EX 993 | EX 994 | EX 990 |
|---|---|---|---|---|---|
| Melt Index | g/10 min. | 1.30 | 1.25 | 1.32 | 1.24 |
| Moisture | ppm | 482 | 214 | 997 | 654 |
| Cation Type | — | Na | Li | K | Zn |
| M+ content by AAS | wt % | 2.74 | 0.87 | 4.54 | 0 |
| Zn content by AAS | wt % | 0 | 0 | 0 | 3.16 |
| Density | kg/m$^3$ | 959 | 945 | 976 | 977 |
| Vicat softening point | ° C. | 52.5 | 51 | 50 | 55.0 |
| Crystallization point | ° C. | 40.1 | 39.8 | 44.9 | 54.4 |
| Melting point | ° C. | 82.6 | 81.0 | 80.4 | 81.0 |
| Tensile at yield | MPa | 23.8 | 24.6 | 22 | 16.5 |
| Tensile at break | MPa | 32.3 | 31.1 | 29.7 | 23.8 |
| Elongation at break | % | 330 | 260 | 340 | 357 |
| 1% secant modulus | MPa | 389 | 379 | 312 | 205 |
| Flexural modulus | MPa | 340 | 368 | 303 | 183 |
| Abrasion resistance | mg | 20.0 | 9.2 | 15.2 | 20.5 |
| Hardness Shore D | — | 62 | 62.5 | 61 | 56 |
| Zwick Rebound | % | 61 | 63 | 59 | 48 |

Furthermore, as a result of the development by the assignee of this application of a number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that these new cation neutralized high acid ionomer blends produce inner cover layer compositions exhibiting enhanced hardness and resilience due to synergies which occur during processing. Consequently, the metal cation neutralized high acid ionomer resins recently produced can be blended to produce substantially higher C.O.R.'s than those produced by the low acid ionomer inner cover compositions presently commercially available.

More particularly, several new metal cation neutralized high acid ionomer resins have been produced by the inventor by neutralizing, to various extents, high acid copolymers of an alpha-olefin and an alpha, beta-unsaturated carboxylic acid with a wide variety of different metal cation salts. This discovery is the subject matter of U.S. application Ser. No. 08/493,089, incorporated herein by reference. It has been found that numerous new metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the inner cover layer for the golf ball of the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Michigan, under the "Primacor" designation. These high acid base copolymers exhibit the typical properties set forth below in Table 4.

TABLE 4

Typical Properties of Primacor Ethylene-Acrylic Acid Copolymers

| GRADE | PERCENT ACID | DENSITY G/CC | MELT INDEX | TENSILE YD ST G/10 MIN | FLEXURAL MODULUS (PSI) | VICAT SOFT PT (° PSI) | SHORE D HARDNESS (° C.) |
|---|---|---|---|---|---|---|---|
| ASTM | | D-792 | D-1238* | D-630 | D-790 | D-1525 | D-2240 |
| 5980 | 20.0 | 0.958 | 300.0 | — | 4800 | 43 | 50 |
| 5990 | 20.0 | 0.955 | 1300.0 | 650 | | 40 | 42 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

*190° C.

Due to the high molecular weight of the Primacor 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

As indicated below in Table 5 and more specifically in Example 1 in U.S. application Ser. No. 08/493,089, a number of new types of metal cation neutralized high acid ionomers can be obtained from the above indicated process. These include new high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high add ionomer resins neutralized with cations such as sodium, potassium, lithium, zinc, magnesium, manganese, calcium and nickel, several new cation neutralized acrylic acid based high acid ionomer resins are produced.

TABLE 5

| Formulation No. | Wt-X Cation Salt | Wt-X Neutralization | Melt Index | C.O.R. | Shore D Hardness |
|---|---|---|---|---|---|
| 1(NaOH) | 6.98 | 67.5 | 0.9 | .804 | 71 |
| 2(NaOH) | 5.66 | 54.0 | 2.4 | .808 | 73 |
| 3(NaOH) | 3.84 | 35.9 | 12.2 | .812 | 69 |
| 4(NaOH) | 2.91 | 27.0 | 17.5 | .812 | (brittle) |
| 5(MnAc) | 19.6 | 71.7 | 7.5 | .809 | 73 |
| 6(MnAc) | 23.1 | 88.3 | 3.5 | .814 | 77 |
| 7(MnAc) | 15.3 | 53.0 | 7.5 | .810 | 72 |
| 8(MnAc) | 26.5 | 106 | 0.7 | .813 | (brittle) |
| 9(LiOH) | 4.54 | 71.3 | 0.6 | .810 | 74 |
| 10(LiOH) | 3.38 | 52.5 | 4.2 | .818 | 72 |
| 11(LiOH) | 2.34 | 35.9 | 18.6 | .815 | 72 |
| 12(KOH) | 5.30 | 36.0 | 19.3 | Broke | 70 |

TABLE 5-continued

| Formulation No. | Wt-X Cation Salt | Wt-X Neutralization | Melt Index | C.O.R. | Shore D Hardness |
|---|---|---|---|---|---|
| 13(KOH) | 8.26 | 57.9 | 7.18 | .804 | 70 |
| 14(KOH) | 10.7 | 77.0 | 4.3 | .801 | 67 |
| 15(ZnAc) | 17.9 | 71.5 | 0.2 | .806 | 71 |
| 16(ZnAc) | 13.9 | 53.0 | 0.9 | .797 | 69 |
| 17(ZnAc) | 9.91 | 36.1 | 3.4 | .793 | 67 |
| 18(MgAc) | 17.4 | 70.7 | 2.8 | .814 | 74 |
| 19(MgAc) | 20.6 | 87.1 | 1.5 | .815 | 76 |
| 20(MgAc) | 13.8 | 53.8 | 4.1 | .814 | 74 |
| 21(CaAc) | 13.2 | 69.2 | 1.1 | .813 | 74 |
| 22(CaAc) | 7.12 | 34.9 | 10.1 | .808 | 70 |

Controls: 50/50 Blend of Ioteks 8000/7030 C.O.R. = 810/65 Shore D Hardness
DuPont High Acid Surlyn ® 8422 (Na) C.O.R. = 811/70 Shore D Hardness
DuPont High Acid Surlyn ® 8162 (Zn) C.O.R. = 807/65 Shore D Hardness
Exxon High Acid Iotek Ex-960 (Zn) C.O.R. = 796/65 Shore D Hardness

| 23(MgO) | 2.91 | 53.5 | 2.5 | .813 | |
| 24(MgO) | 3.85 | 71.5 | 2.8 | .808 | |
| 25(MgO) | 4.76 | 89.3 | 1.1 | .809 | |
| 26(MgO) | 1.96 | 35.7 | 7.5 | .815 | |

Control for Formulations 23-26 is 50/50 Iotek 8000/7030, C.O.R. = 814, Formulation 24 C.O.R. was normalized to that control accordingly

| 27(NiAc) | 13.04 | 61.1 | 0.2 | .802 | 71 |
| 28(NiAc) | 10.71 | 48.9 | 0.5 | .799 | 72 |
| 29(NiAc) | 8.26 | 36.7 | 1.8 | .796 | 69 |
| 30(NiAc) | 5.66 | 24.4 | 7.5 | .786 | 64 |

Control for Formulation Nos. 27-30 is 50/50 Iotek 8000/7030, C.O.R. = .807

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

When utilized in the construction of the inner layer of a multi-layered golf ball, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451.

Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for production of an inner cover layer of a multi-layered golf ball. By using these high acid ionomer resins, harder, stiffer inner cover layers having higher C.O.R.s, and thus longer distance, can be obtained.

More preferably, it has been found that when two or more of the above-indicated high acid ionomers, particularly blends of sodium and zinc high acid ionomers, are processed to produce the covers of multi-layered golf balls, (i.e., the inner cover layer herein) the resulting golf balls will travel further than previously known multi-layered golf balls produced with low acid ionomer resin covers due to the balls' enhanced coefficient of restitution values.

The low acid ionomers which may be suitable for use in formulating the inner layer compositions of the second and third embodiments of the subject invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–100%, preferably 30–70%) by the metal ions. Each of the low acid ionomer resins which may be included in the inner layer cover compositions of the invention contains 16% by weight or less of a carboxylic acid.

The inner layer compositions include the low acid ionomers such as those developed and sold by E.I. DuPont de Nemours & Company under the trademark "Surlyn®" and by Exxon Corporation under the trademark "Escor®" or tradename "Iotek", or blends thereof.

The low acid ionomer resins available from Exxon under the designation "Escor®" and/or "Iotek", are somewhat similar to the low acid ionomeric resins available under the "Surlyn®" trademark. However, since the Escor®/Iotek ionomeric resins are sodium or zinc salts of poly(ethylene-acrylic acid) and the "Surlyn®" resins are zinc, sodium, magnesium, etc. salts of poly(ethylene-methacrylic acid), distinct differences in properties exist.

When utilized in the construction of the inner layer of a multi-layered golf ball, it has been found that the low acid ionomer blends extend the range of compression and spin rates beyond that previously obtainable. More preferably, it has been found that when two or more low acid ionomers, particularly blends of sodium and zinc ionomers, are processed to produce the covers of multi-layered golf balls, (i.e., the inner cover layer herein) the resulting golf balls will travel further and at an enhanced spin rate than previously known multi-layered golf balls, such an improvement is particularly noticeable in enlarged or oversized golf balls.

As shown in the Examples, use of an inner layer formulated from blends of lower acid ionomers produces multi-layer golf balls having enhanced compression and spin rates. These are the properties desired by the more skilled golfer.

In a third embodiment of the inner cover layer, a blend of high and low acid ionomer resins is used. These can be the ionomer resins described above, combined in a weight ratio which preferably is within the range of 10–90 to 90–10 high and low acid ionomer resins.

A fourth embodiment of the inner cover layer is primarily or fully non-ionomeric thermoplastic material. Suitable non-ionomeric materials include metallocene catalyzed polyolefins or polyamides, polyamide/ionomer blends, polyphenylene ether/ionomer blends, etc., which have a shore D hardness of $\geq 60$ and a flex modulus of greater than about 30,000 psi, or other hardness and flex modulus values which are comparable to the properties of the ionomers described above. Other suitable materials include but are not limited to thermoplastic or thermosetting polyurethanes, thermoplastic block polyesters, e.g., a polyester elastomer such as that marketed by DuPont under the trademark Hytrel®, or thermoplastic block polyamides, e.g., a polyester amide such as that marketed by Elf Atochem S.A. under the trademark Pebax®, a blend of two or more non-ionomeric thermoplastic elastomers, or a blend of one or more ionomers and one or more non-ionomeric thermoplastic elastomers. These materials can be blended with the ionomers described above in order to reduce cost relative to the use of higher quantities of ionomer.

Outer Cover Layer

While the core with the hard inner cover layer formed thereon provides the multi-layer golf ball with power and distance, the outer cover layer 16 is comparatively softer than the inner cover layer. The softness provides for the feel and playability characteristics typically associated with balata or balata-blend balls. The outer cover layer or ply is comprised of a relatively soft, low modulus (about 1,000 psi to about 10,000 psi) and, in one embodiment, low acid (less than 16 weight percent acid) ionomer, an ionomer blend, a non-ionomeric thermoplastic or thermosetting material such as, but not limited to, a metallocene catalyzed polyolefin such as EXACT material available from EXXON, a thermoplastic or thermoset polyurethane, thermoplastic block polyesters, e.g., a polyester elastomer such as that marketed by DuPont under the trademark Hytrel®, or thermoplastic block polyamides, such as a polyester amide such as that marketed by Elf Atochem S.A. under the trademark Pebax®, a blend of two or more non-ionomeric thermoplastic or thermosetting materials, or a blend of one or more ionomers and one or more non-ionomeric thermoplastic materials. The outer layer is 0.010 to about 0.15 inches in thickness, preferably 0.01–0.10 inches in thickness, more desirably 0.03 to 0.06 inches in thickness for a 1.680 inch ball and 0.04 to 0.07 inches in thickness for a 1.72 inch or more ball), but thick enough to achieve desired playability characteristics while minimizing expense. Thickness is defined as the average thickness of the non-dimpled areas of the outer cover layer. The outer cover layer 16 has a Shore D hardness of 55 or less, and more preferably 50 or less.

In one embodiment, the outer cover layer preferably is formed from an ionomer which constitutes at least 75 weight % of an acrylate ester-containing ionic copolymer or blend of acrylate ester-containing ionic copolymers. This type of outer cover layer in combination with the core and inner cover layer described above results in golf ball covers having a favorable combination of durability and spin rate. The one or more acrylate ester-containing ionic copolymers each contain an olefin, an acrylate ester, and an acid. In a blend of two or more acrylate ester-containing ionic copolymers, each copolymer may contain the same or a different olefin, acrylate ester and acid than are contained in the other copolymers. Preferably, the acrylate ester-containing ionic copolymer or copolymers are terpolymers, but additional monomers can be combined into the copolymers if the monomers do not substantially reduce the scuff resistance or other good playability properties of the cover.

For a given copolymer, the olefin is selected from the group consisting of olefins having 2 to 8 carbon atoms, including, as non-limiting examples, ethylene, propylene, butene-1, hexene-1 and the like. Preferably the olefin is ethylene.

The acrylate ester is an unsaturated monomer having from 1 to 21 carbon atoms which serves as a softening comonomer. The acrylate ester preferably is methyl, ethyl, n-propyl, n-butyl, n-octyl, 2-ethylhexyl, or 2-methoxyethyl 1-acrylate, and most preferably is methyl acrylate or n-butyl acrylate. Another suitable type of softening comonomer is an alkyl vinyl ether selected from the group consisting of n-butyl, n-hexyl, 2-ethylhexyl, and 2-methoxyethyl vinyl ethers.

The acid is a mono- or dicarboxylic acid and preferably is selected from the group consisting of methacrylic, acrylic, ethacrylic, α-chloroacrylic, crotonic, maleic, fumaric, and itaconic acid, or the like, and half esters of maleic, fumaric and itaconic acid, or the like. The acid group of the copolymer is 10–100% neutralized with any suitable cation, for example, zinc, sodium, magnesium, lithium, potassium, calcium, manganese, nickel, chromium, tin, aluminum, or the like. It has been found that particularly good results are obtained when the neutralization level is about 50–100%.

The one or more acrylate ester-containing ionic copolymers each has an individual Shore D hardness of about 5–64. The overall Shore D hardness of the outer cover is 55 or less, and generally is 40–55. It is preferred that the overall Shore D hardness of the outer cover is in the range of 40–50 in order to impart particularly good playability characteristics to the ball.

The outer cover layer of the invention is formed over a core to result in a golf ball having a coefficient of restitution of at least 0.770, more preferably at least 0.780, and most preferably at least 0.790. The coefficient of restitution of the ball will depend upon the properties of both the core and the cover. The PGA compression of the golf ball is 100 or less, and preferably is 90 or less.

The acrylate ester-containing ionic copolymer or copolymers used in the outer cover layer can be obtained by neutralizing commercially available acrylate ester-containing acid copolymers such as polyethylene-methyl acrylate-acrylic acid terpolymers, including ESCOR ATX (Exxon Chemical Company) or poly (ethylene-butyl acrylate-methacrylic acid) terpolymers, including NUCREL (DuPont Chemical Company). Particularly preferred commercially available materials include ATX 320, ATX 325, ATX 310, ATX 350, and blends of these materials with NUCREL 010 and NUCREL 035. The acid groups of these materials and blends are neutralized with one or more of various cation salts including zinc, sodium, magnesium, lithium, potassium, calcium, manganese, nickel, etc. The degree of neutralization ranges from 10–100%. Generally, a higher degree of neutralization results in a harder and tougher cover material. The properties of non-limiting examples of commercially available un-neutralized acid terpolymers which can be used to form the golf ball outer cover layers of the invention are provided below in Table 6.

TABLE 6

| Trade Name | Melt Index dg/min ASTM D1238 | Acid No. % KOH/g | Flex modulus MPa (ASTM D790) | Hardness (Shore D) |
| --- | --- | --- | --- | --- |
| ATX 310 | 6 | 45 | 80 | 44 |
| ATX 320 | 5 | 45 | 50 | 34 |
| ATX 325 | 20 | 45 | 9 | 30 |
| ATX 350 | 6 | 15 | 20 | 28 |
| Nucrel 010 | 11 | 60 | 40 | 40 |
| Nucrel 035 | 35 | 60 | 59 | 40 |

The ionomer resins used to form the outer cover layers can be produced by reacting the acrylate ester-containing acid copolymer with various amounts of the metal cation salts at a temperature above the crystalline melting point of the copolymer, such as a temperature from about 200° F. to about 500° F., preferably from about 250° F. to about 350° F., under high shear conditions at a pressure of from about 100 psi to 10,000 psi. Other well known blending techniques may also be used. The amount of metal cation salt utilized to produce the neutralized ionic copolymers is the quantity which provides a sufficient amount of the metal cations to neutralize the desired percentage of the carboxylic acid groups in the high acid copolymer. When two or more different copolymers are to be used, the copolymers can be blended before or after neutralization. Generally, it is preferable to blend the copolymers before they are neutralized to provide for optimal mixing.

The compatibility of the acrylate ester-containing copolymers with each other in a copolymer blend produces a golf ball outer cover layer having a surprisingly good scuff resistance for a given hardness of the outer cover layer. The golf ball according to the invention has a scuff resistance of no higher than 3.0. It is preferred that the golf ball has a scuff resistance of no higher than about 2.5 to ensure that the golf ball is scuff resistant when used in conjunction with a variety of types of clubs, including sharp-grooved irons, which are particularly inclined to result in scuffing of golf ball covers. The best results according to the invention are obtained when the outer cover layer has a scuff resistance of no more than about 2.0. The scuff resistance test is described in detail below.

Additional materials may also be added to the inner and outer cover layer of the present invention as long as they do not substantially reduce the playability properties of the ball. Such materials include dyes (for example, Ultramarine Blue sold by Whitaker, Clark, and Daniels of South Plainsfield, N.J.) (see U.S. Pat. No. 4,679,795), pigments such as titanium dioxide, zinc oxide, barium sulfate and zinc sulfate; UV absorbers; antioxidants; antistatic agents; and stabilizers. Moreover, the cover compositions of the present invention may also contain softening agents such as those disclosed in U.S. Pat. Nos. 5,312,857 and 5,306,760, including plasticizers, metal stearates, processing acids, etc., and reinforcing materials such as glass fibers and inorganic fillers, as long as the desired properties produced by the golf ball covers of the invention are not impaired.

The outer layer in another embodiment of the invention includes a blend of a soft (low acid) ionomer resin with a small amount of a hard (high acid) ionomer resin. A low modulus ionomer suitable for use in the outer layer blend has a flexural modulus measuring from about 1,000 to about 10,000 psi, with a hardness of about 20 to about 40 on the Shore D scale. A high modulus ionomer herein is one which measures from about 15,000 to about 70,000 psi as measured in accordance with ASTM method D-790. The hardness may be defined as at least 50 on the Shore D scale as measured in accordance with ASTM method D-2240.

Soft ionomers primarily are used in formulating the hard/soft blends of the cover compositions. These ionomers include acrylic acid and methacrylic acid based soft ionomers. They are generally characterized as comprising sodium, zinc, or other mono- or divalent metal cation salts of a terpolymer of an olefin having from about 2 to 8 carbon atoms, methacrylic acid, acrylic acid, or another $\alpha,\beta$-unsaturated carboxylic acid, and an unsaturated monomer of the acrylate ester class having from 1 to 21 carbon atoms. The soft ionomer is preferably made from an acrylic acid base polymer in an unsaturated monomer of the acrylate ester class.

Certain ethylene-acrylic acid based soft ionomer resins developed by the Exxon Corporation under the designation "Iotek 7520" (referred to experimentally by differences in neutralization and melt indexes as LDX 195, LDX 196, LDX 218 and LDX 219) may be combined with known hard ionomers such as those indicated above to produce the inner and outer cover layers. The combination produces higher C.O.R.s at equal or softer hardness, higher melt flow (which corresponds to improved, more efficient molding, i.e., fewer rejects) as well as significant cost savings versus the outer layer of multi-layer balls produced by other known hard-soft ionomer blends as a result of the lower overall raw materials costs and improved yields.

Test data collected by the inventor indicates that Iotek 7520 resins have Shore D hardnesses of about 32 to 36 (per ASTM D-2240), melt flow indexes of 3±0.5 g/10 min (at 190+ C. per ASTM D-1288), and a flexural modulus of about 2500–3500 psi (per ASTM D-790). Furthermore, testing by an independent testing laboratory by pyrolysis mass spectrometry indicates that Iotek 7520 resins are generally zinc salts of a terpolymer of ethylene, acrylic acid, and methyl acrylate.

Furthermore, the inventor has found that a grade of an acrylic acid based soft ionomer available from the Exxon Corporation under the designation Iotek 7510 is also effective when combined with the hard ionomers indicated above in producing golf ball covers exhibiting higher C.O.R. values at equal or softer hardness than those produced by known hard-soft ionomer blends. In this regard, Iotek 7510 has the advantages (i.e. improved flow, higher C.O.R. values at equal hardness, increased clarity, etc.) produced by the Iotek 7520 resin when compared to the methacrylic acid base soft ionomers known in the art (such as the Surlyn® 8625 and the Surlyn® 8629 combinations disclosed in U.S. Pat. No. 4,884,814).

In addition, Iotek 7510, when compared to Iotek 7520, produces slightly higher C.O.R. values at equal softness/hardness due to the Iotek 7510's higher hardness and neutralization. Similarly, Iotek 7510 produces better release properties (from the mold cavities) due to its slightly higher stiffness and lower flow rate than Iotek 7520. This is important in production where the soft covered balls tend to have lower yields caused by sticking in the molds and subsequent punched pin marks from the knockouts.

According to Exxon, Iotek 7510 is of similar chemical composition as Iotek 7520 (i.e. a zinc salt of a terpolymer of ethylene, acrylic acid, and methyl acrylate) but is more highly neutralized. Based upon FTIR analysis, Iotek 7520 is estimated to be about 30–40 wt.-% neutralized and Iotek 7510 is estimated to be about 40–60 wt.-% neutralized. The typical properties of Iotek 7510 in comparison of those of Iotek 7520 in comparison of those of Iotek 7520 are set forth below:

TABLE 7

Physical Properties of Iotek 7510 in Comparison to Iotek 7520

| Property | Unit | IOTEK 7520 | IOTEK 7510 |
| --- | --- | --- | --- |
| Melt Index | g/10 min. | 2.0 | 0.8 |
| Density | g/cc | 0.96 | 0.97 |
| Melting Point | ° F. | 151 | 149 |
| Vicat Softening Point | ° F. | 108 | 109 |
| Flex Modulus | psi | 3800 | 5300 |
| Tensile Strength | psi | 1450 | 1750 |
| Elongation | % | 160 | 690 |
| Hardness, Shore D | — | 32 | 35 |

The hard ionomer resins utilized to produce the outer cover layer composition hard/soft blends include ionic copolymers which are the sodium, zinc, magnesium, lithium, etc. salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

The hard ionomeric resins are likely copolymers of ethylene and acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor® and sold under the designation "Iotek" are somewhat similar to the hard ionomeric resins sold under the Surlyn® trademark. However, since the "Iotek" ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard "Iotek" resins (i.e., the acrylic acid based hard ionomer resins) are the more preferred hard resins for use in formulating the layer blends for use in the present invention. In addition, various blends of "Iotek" and Surlyn® hard ionomeric resins, as well as other available ionomeric resins, may be utilized in the present invention in a similar manner.

Examples of commercially available hard ionomeric resins which may be used in the present invention in formulating the outer cover blends include the hard sodium ionic copolymer sold under the trademark Surlyn® 8940 and the hard zinc ionic copolymer sold under the trademark Surlyn® 9910. Surlyn® 8940 is a copolymer of ethylene with methacrylic acid and about 15 weight percent acid which is about 29 percent neutralized with sodium ions. This resin has an average melt flow index of about 2.8. Surlyn® 9910 is a copolymer of ethylene and methacrylic acid with about 15 weight percent acid which is about 58 percent neutralized with zinc ions. The average melt flow index of Surlyn® 9910 is about 0.7. The typical properties of Surlyn® 9910 and 8940, as well as other Surlyn® resins, are set forth below in Tables 8 and 9:

TABLE 8

Typical Properties of Commercially Available Hard Surlyn ® Resins Suitable for Use in the Present Invention

| | ASTM D | 8940 | 9910 | 8820 | 8528 | 9970 | 9730 |
| --- | --- | --- | --- | --- | --- | --- | --- |
| Cation type | | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific gravity, g/cm³ | D-792 | 0.95 | 0.97 | 0.95 | 0.94 | 0.95 | 0.95 |
| Hardness, Shore D | D-2240 | 65 | 64 | 66 | 60 | 62 | 63 |
| Tensile strength, (kpsi) | D-638 | (4.8) | (3.6) | (5.4) | (4.2) | (3.2) | (4.1) |
| Mpa | | 33.1 | 24.8 | 37.2 | 29.0 | 22.1 | 28.3 |
| Elongation, % | D-638 | 470 | 290 | 350 | 450 | 480 | 460 |

TABLE 8-continued

Typical Properties of Commercially Available Hard Surlyn ® Resins
Suitable for Use in the Present Invention

| | ASTM D | 8940 | 9910 | 8820 | 8528 | 9970 | 9730 |
|---|---|---|---|---|---|---|---|
| Flexural Modulus, (kpsi) | D-790 | (51) | (48) | (55) | (32) | (28) | (30) |
| Mpa | | 350 | 330 | 380 | 220 | 190 | 210 |
| Tensile Impact (23° C.), KJ/m² | D-1822S | 1020 | 1020 | 865 | 1180 | 760 | 1240 |
| (ft.-lbs./in²) | | (485) | (485) | (410) | (550) | (360) | (590) |
| Vicat Temperature, ° C. | D-1525 | 63 | 62 | 58 | 73 | 61 | 73 |

TABLE 9

Properties of Additional Hard Surlyn ® Resins

| IONOMER | | SURLYN ® 8920 | SURLYN ® 8140 | SURLYN ® 9120 |
|---|---|---|---|---|
| Cation | | Na | Na | Zn |
| Melt Flow Index | gms/10 min. | 0.9 | 2.6 | 1.3 |
| MP | ° C. | 84 | 88 | 85 |
| FP | ° C. | 52 | 49 | 50 |
| Tensile Strength | kpsi | 5.4 | 5.0 | 3.8 |
| Yield Strength | kpsi | 2.2 | 2.8 | 2.4 |
| Elongation | % | 350 | 340 | 280 |
| Flex Modulus | kpsi | 55 | 71 | 64 |
| Shore D Hardness | | 66 | 70 | 69 |

Examples of the more pertinent acrylic acid based hard ionomer resin suitable for use in the cover compositions sold under the "Iotek" tradename by the Exxon Corporation include Iotek, but are not limited to, 8000, 8010, 8020, 8030, 7030, 7010, 7020, EX 1001–1009, Iotek 959 and Iotek 960, as well as the materials listed above on Tables 2 and 3. The typical properties of the remainder of these and other Iotek ionomers suited for use in formulating the cover compositions are set forth below in Tables 10 and 11:

TABLE 11

Examples of Exxon High Molecular Weight Ionomers

| PROPERTY | Ex 1005 | Ex 1006 | Ex 1007 | Ex 1008 | Ex 1009 | 7310 |
|---|---|---|---|---|---|---|
| Melt Index, g/10 min. | 0.7 | 1.3 | 1.0 | 1.4 | 0.8 | 1.0 |
| Cation | Na | Na | Zn | Zn | Na | Zn |
| Melting Point, ° C. | 85.3 | 86 | 85.8 | 86 | 91.3 | 91 |
| Vicat Softening Point, ° C. | 54 | 57 | 60.5 | 60 | 56 | 69 |
| Tensile @ Break, MPa | 33.9 | 33.5 | 24.1 | 23.6 | 32.4 | 24 |
| Elongation @ Break, % | 403 | 421 | 472 | 427 | 473 | 520 |
| Hardness, Shore D | 58 | 58 | 51 | 50 | 56 | 52 |
| Flexural Modulus, MPa | 289 | 290 | 152 | 141 | 282 | 150 |

It has been determined that when hard/soft ionomer blends are used for the outer cover layer, good results are achieved when the relative combination is in a range of about 3–25 percent hard ionomer and about 75–97 percent soft ionomer.

Moreover, in alternative embodiments, the outer cover layer formulation may also comprise up to 100 wt % of a soft, low modulus non-ionomeric thermoplastic material including a polyester polyurethane such as B.F. Goodrich Company's Estane® polyester polyurethane X-4517. The non-ionomeric thermoplastic material may be blended with

TABLE 10

Typical Properties of Iotek Ionomers

| Resin Properties | ASTM Method | Units | 7010 | 7020 | 7030 | 8000 | 8020 | 8030 |
|---|---|---|---|---|---|---|---|---|
| Cation Type | | | zinc | zinc | zinc | sodium | sodium | sodium |
| Melt Index | D-1238 | g/10 min | 0.8 | 1.5 | 2.5 | 0.8 | 1.6 | 2.8 |
| Density | D-1505 | kg/m³ | 968 | 965 | 964 | 957 | 956 | 956 |
| Melting Point | D-3417 | ° C. | 83.5 | 84 | 85 | 83 | 84 | 87 |
| Crystallization Point | D-3417 | ° C. | 55 | 56 | 58 | 45 | 47 | 49 |
| Vicat Softening Point | D-1525 | ° C. | 60 | 60 | 60 | 54 | 54.5 | 55.5 |
| Tensile strength at break | D-638 | MPa | 24.5 | 23.5 | 22.6 | 33 | 32.5 | 32 |
| Yield Strength | D-638 | MPa | 14 | 13 | 12 | 19 | 18.5 | 18 |
| Elongation at break | D-638 | % | 440 | 450 | 460 | 370 | 380 | 410 |
| 1% Secant modulus | D-638 | MPa | 150 | 135 | 125 | 280 | 280 | 280 |
| Shore Hardness D | D-2240 | — | 54 | 53 | 52 | 60 | 60 | 60 |
| Flex modulus (3 mm) | D-790 | Mpa | 190 | 175 | 155 | 320 | 340 | 355 | a soft ionomer. For example, polyamides blend well with soft ionomer. According to B.F. Goodrich, Estane® X-4517 has the following properties:

| Properties of Estane ® X-4517 | |
| --- | --- |
| Tensile | 1430 |
| 100% | 815 |
| 200% | 1024 |
| 300% | 1193 |
| Elongation | 641 |
| Youngs Modulus | 1826 |
| Hardness A/D | 88/39 |
| Dayshore Rebound | 59 |
| Solubility in Water | Insoluble |
| Melt processing temperature | >350° F. (>177° C.) |
| Specific Gravity ($H_2O$ = 1) | 1.1–1.3 |

Other soft, relatively low modulus non-ionomeric thermoplastic or thermoset materials may also be utilized to produce the inner and/or outer cover layers as long as the non-ionomeric materials produce the playability and durability characteristics desired without adversely affecting the enhanced travel distance characteristic produced by the high acid ionomer resin composition. These include, but are not limited to thermoplastic polyurethanes such as Texin thermoplastic polyurethanes from Mobay Chemical Co. and the Pellethane thermoplastic polyurethanes from Dow Chemical Co.; non-ionomeric thermoset polyurethanes including but not limited to those disclosed in U.S. Pat. No. 5,334,673; styrene-butadiene-styrene block copolymers, including functionalized styrene-butadiene-styrene block copolymers, styrene-ethylene-butadiene-styrene (SEBS) block copolymers such as KRATON materials from Shell Chem. Co., including functionalized SEBS block copolymers; metallocene catalyzed polyolefins; ionomer/rubber blends such as those in Spalding U.S. Pat. Nos. 4,986,545; 5,098,105 and 5,187,013; and, Hytrel polyester elastomers from DuPont and Pebax polyesteramides from Elf Atochem S.A.

Core

The cores of the inventive golf balls typically have a coefficient of restitution of about 0.750 or more, more preferably 0.770 or more and a PGA compression of about 90 or less, and more preferably 70 or less. The core used in the golf ball of the invention preferably is a solid. The term "solid cores" as used herein refers not only to one piece cores but also to those cores having a separate solid layer beneath the covers and over the central core. The cores have a weight of 25–40 grams and preferably 30–40 grams. When the golf ball of the invention has a solid core, this core can be compression molded from a slug of uncured or lightly cured elastomer composition comprising a high cis content polybutadiene and a metal salt of an α, β, ethylenically unsaturated carboxylic acid such as zinc mono- or diacrylate or methacrylate. To achieve higher coefficients of restitution and/or to increase hardness in the core, the manufacturer may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces. Non-limiting examples of other materials which may be used in the core composition including compatible rubbers or ionomers, and low molecular weight fatty acids such as stearic acid. Free radical initiator catalysts such as peroxides are admixed with the core composition so that on the application of heat and pressure, a curing or cross-linking reaction takes place.

A thread wound core may comprise a liquid, solid, gel or multi-piece center. The thread wound core is typically obtained by winding a thread of natural or synthetic rubber, or thermoplastic or thermosetting elastomer such as polyurethane, polyester, polyamide, etc. on a solid, liquid, gel or gas filled center to form a thread rubber layer that is then covered with one or more mantle or cover layers. Additionally, prior to applying the cover layers, the thread wound core may be further treated or coated with an adhesive layer, protective layer, or any substance that may improve the integrity of the wound core during application of the cover layers and ultimately in usage as a golf ball. Since the core material is not an integral part of the present invention, further detailed discussion concerning the specific types of core materials which may be utilized with the cover compositions of the invention are not specifically set forth herein. Since the core material is not an integral part of the present invention, a detailed discussion concerning the specific types of core materials which may be utilized with the cover compositions of the invention are not specifically set forth herein.

Method of Making Golf Ball

In preparing golf balls in accordance with the present invention, a hard inner cover layer is molded (by injection molding or by compression molding) about a core (preferably a solid core). A comparatively softer outer layer is molded over the inner layer.

The solid core for the multi-layer ball is about 1.2–1.6 inches in diameter, although it may be possible to use cores in the range of about 1.0–2.0 inches. Conventional solid cores are typically compression or injection molded from a slug or ribbon of uncured or lightly cured elastomer composition comprising a high cis content polybutadiene and a metal salt of an α, β, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, larger amounts of metal oxide than those that are needed to achieve the desired coefficient are often included in conventional cores in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

The inner cover layer which is molded over the core is about 0.01 inches to about 0.10 inches in thickness, preferably about 0.03–0.07 inches thick. The inner ball which includes the core and inner cover layer preferably has a diameter in the range of 1.25 to 1.60 inches. The outer cover layer is about 0.01 inches to about 0.10 inches in thickness. Together, the core, the inner cover layer and the outer cover layer combine to form a ball having a diameter of 1.680 inches or more, the minimum diameter permitted by the rules of the United States Golf Association and weighing no more than 1.62 ounces.

In a particularly preferred embodiment of the invention, the golf ball has a dimple pattern which provides coverage of 65% or more. The golf ball typically is coated with a durable, abrasion-resistant, relatively non-yellowing finish coat.

The various cover composition layers of the present invention may be produced according to conventional melt blending procedures. Generally, the copolymer resins are blended in a Banbury type mixer, two-roll mill, or extruder prior to neutralization. After blending, neutralization then occurs in the melt or molten state in the Banbury mixer. Mixing problems are minimal because preferably more than 75 wt %, and more preferably at least 80 wt % of the ionic copolymers in the mixture contain acrylate esters, and in this respect, most of the polymer chains in the mixture are similar to each other. The blended composition is then formed into slabs, pellets, etc., and maintained in such a state until molding is desired. Alternatively, a simple dry blend of the pelletized or granulated resins which have previously been neutralized to a desired extent and colored masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process. A similar process is utilized to formulate the high acid ionomer resin compositions used to produce the inner cover layer. In one embodiment of the invention, a masterbatch of non-acrylate ester-containing ionomer with pigments and other additives incorporated therein is mixed with the acrylate ester-containing copolymers in a ratio of about 1–7 weight % masterbatch and 93–99 weight % acrylate ester-containing copolymer.

The golf balls of the present invention can be produced by molding processes which include but are not limited to those which are currently well known in the golf ball art. For example, the golf balls can be produced by injection molding or compression molding the novel cover compositions around a wound or solid molded core to produce an inner ball which typically has a diameter of about 1.50 to 1.67 inches. The outer layer is subsequently molded over the inner layer to produce a golf ball having a diameter of 1.620 inches or more, preferably about 1.680 inches or more. Although either solid cores or wound cores can be used in the present invention, as a result of their lower cost and superior performance, solid molded cores are preferred over wound cores. The standards for both the minimum diameter and maximum weight of the balls are established by the United States Golf Association (U.S.G.A).

In compression molding, the inner cover composition is formed via injection at about 380° F. to about 450° F. into smooth surfaced hemispherical shells which are then positioned around the core in a mold having the desired inner cover thickness and subjected to compression molding at 200° to 300° F. for about 2 to 10 minutes, followed by cooling at 50° to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° to about 100° F. Subsequently, the outer cover layer is molded about the core and the inner layer by similar compression or injection molding techniques to form a dimpled golf ball of a diameter of 1.680 inches or more.

After molding, the golf balls produced may undergo various further processing steps such as buffing, painting and marking as disclosed in U.S. Pat. No. 4,911,451.

The resulting golf ball produced from the hard inner layer and the relatively softer, low flexural modulus outer layer provide for an improved multi-layer golf ball which provides for desirable coefficient of restitution and durability properties while at the same time offering the feel and spin characteristics associated with soft balata and balata-like covers of the prior art.

Unique Spin Characteristics

As indicated above, the golf ball of the invention is unique in that it provides good distance when hit with a driver, good control off of irons, and excellent spin on short chip shots. This golf ball is superior to conventional soft covered two-piece or wound balls in that it has lower spin off of a driver and higher spin on short shots.

The spin factor of the ball of the invention may be specified in the manner described below.

Step 1. A golf ball testing machine is set up in order that it meets the following conditions for hitting a 1995 Top-Flite Tour Z-balata 90 ball produced by Spalding & Evenflo Companies.

| Club | Launch Angle | Ball Speed | Spin Rate |
| --- | --- | --- | --- |
| 9 iron | 21 ± 1.5 | 160.5 ± 9.0 | 9925 ± 600 |

The machine is set up such that the above conditions are met for each test using 10 Z-balata 90 golf balls which are hit 3 times each at the same machine setting. The thirty measurements of spin rate are averaged to obtain $N_{9I\text{-}ZB}$.

Step 2. Ten golf balls of the invention (Ball X) are hit 3 times each using the same machine setting as was used for the Z-balata balls and spin data is collected. Any clearly erratic spin test result is eliminated and replaced by a new test with the same ball. The thirty measurements of spin rate are averaged to obtain $N_{9I\text{-}X}$.

Step 3. The machine is set up in order that it meets the following conditions for hitting a 1995 Z-balata 90 ball, the conditions being intended to replicate a 30-yard chip shot:

| Club | Launch Angle | Ball Speed | Spin Rate |
| --- | --- | --- | --- |
| Sand Wedge | 28 ± 4.5 | 58.0 ± 4.0 | 4930 ± 770 |

The machine is set up such that the above conditions are met for each test using 10 Z-balata 90 golf balls which are hit 3 times each at the same machine setting. The thirty measurements of spin rate are averaged to obtain $N_{SW\text{-}ZB}$.

Step 4. The 10 golf balls used in Step 2 are hit three times each using the same machine setting as was used in Step 3 and spin data is collected. Any clearly erratic spin test result is eliminated and replaced by a new test with the same ball. The thirty measurements of spin rate are averaged to obtain $N_{SW\text{-}X}$.

Step 5. The numerical values of $N_{9I\text{-}ZB}$, $N_{9I\text{-}X}$, $N_{SW\text{-}ZB}$ and $N_{SW\text{-}X}$ are inserted into the following formula to obtain a spin factor:

$$\text{Spin factor} = \frac{N_{SW\text{-}X}}{N_{9I\text{-}X}} - \frac{N_{SW\text{-}ZB}}{N_{9I\text{-}ZB}} \times 100$$

The golf ball of the invention has a spin factor of 3.0 or more, more preferably 5.0 or more, and most preferably 8.0 or more.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLE 1

Ionic Terpolymer-Containing Cover

A set of two-piece golf balls was made with solid cores and a cover composition of 75 weight % NUCREL 035, which is an acrylate ester-containing acid terpolymer, and 25 weight % of a masterbatch containing 4.5 weight % MgO in Surlyn® 1605 ("MgO Masterbatch"). The terpolymer was reacted with the masterbatch at a temperature of about 250° F. under high shear conditions at a pressure of about 0 to 100 psi. The magnesium in the masterbatch neutralized acid groups of the terpolymer at a level of about 62% neutralization. The molded balls were finished with polyurethane primer and top coats. The PGA compression, coefficient of restitution, Shore C hardness, scuff resistance, spin rate and cold crack of the golf balls were determined. The results are shown on Table 10 below.

To measure cold crack, the finished golf balls were stored at −10° F. for at least 24 hours and were then subjected to 5 blows in a coefficient machine at 165 ft/sec. The balls were allowed to return to room temperature and were then visually inspected for cover cracking. None of the golf balls experienced cracking.

Coefficient of restitution (C.O.R.) was measured by firing the resulting golf ball in an air cannon at a velocity of 125 feet per second against a steel plate which was positioned 12 feet from the muzzle of the cannon. The rebound velocity was then measured. The rebound velocity was divided by the forward velocity to give the coefficient of restitution. Shore hardness was determined in general accordance with ASTM Test 2240, but was measured on a non-dimpled area of the surface of the golf ball.

COMPARATIVE EXAMPLE 1

Ionic Copolymer Cover (Non-Terpolymer)

A set of 12 two-piece golf balls was made according to the same procedure as that of Example 1 with the exception that NUCREL 925, a non-acrylate ester-containing acid copolymer was substituted for NUCREL 035. The resulting golf ball cover was too hard, resulting in four breaks during cold crack testing. The results are shown on Table 10.

COMPARATIVE EXAMPLE 2

Ionomer—Non-Ionic Terpolymer Blend

The procedure of Example 1 was repeated with the exception that the MgO Masterbatch was replaced by pure Surlyn® 1605. All of the golf ball covers broke during cold crack testing. The results are shown on Table 10.

COMPARATIVE EXAMPLE 3

Ionomer—Non-Ionic Copolymer Blend

The procedure of Comparative Example 1 was repeated with the exception that the MgO masterbatch was replaced by pure Surlyn® 1605. The results are shown on Table 10. When subjected to cold crack testing, all of the golf ball covers broke.

As can be seen from the results of Example 1 and Comparative Examples 1–3, inferior golf balls are obtained when a hard, non-acrylate ester-containing copolymer is used instead of a softer, acrylate ester-containing terpolymer, and when either an acrylate ester-containing acid terpolymer or a non-acrylate ester-containing acid copolymer is not neutralized with metal ions.

TABLE 10

| Experiment No. | Cover Material | Weight | PGA Comp. | COR (×1000) | Shore C Hardness | Cold Crack |
|---|---|---|---|---|---|---|
| 1-1 | 75% Nucrel 035/ 25% MgO MB in Surlyn 1605 | 45.2 | 104 | .783 | 80 | No breaks |
| Comp. 1 | 75% Nucrel 925/ 25% MgO MB in Surlyn 1605 | 45.1 | 111 | .798 | 90 | 4 breaks |
| Comp. 2 | 75% Nucrel 035/ 25% Surlyn 1605 | 45.1 | 99 | .774 | 70 | All broke |
| Comp. 3 | 75% Nucrel 925/ 25% Surlyn 1605 | 45.2 | 106 | .790 | 75 | All broke |

EXAMPLE 2

Ionic Terpolymers

An acrylate ester-containing terpolymer sold as ESCOR ATX 325 (Exxon Chemical Co.) was 57% neutralized with lithium cations. The ionomeric material, which also contained titanium dioxide, brightener, etc. from a white masterbatch, was placed over a solid golf ball core and the golf ball was primed and top coated. The properties of the resulting golf ball are shown on Table 11. This procedure was repeated using different combinations of terpolymers with cations and cation blends at the degrees of neutralization which are shown on Table 11. In the cation blends, mole ratios were about 1:1:1. All of the ATX materials shown on Table 8 are ESCOR ATX materials available from Exxon Chemical Co. The Nucrel materials are available from DuPont Chemical Co. Primacor 3440 is available from Dow Chemical Co.

The spin rate of the golf ball was measured by striking the resulting golf balls with a pitching wedge or 9-iron wherein the club-head speed is about 80 feet per second and the ball was launched at an angle of 26 to 34 degrees with an initial velocity of 100–115 feet per second. The spin rate was measured by observing the rotation of the ball in flight using stop action Strobe photography or via the use of a high speed video system.

The scuff resistance test was conducted in the following manner: a Top-Flite tour pitching wedge (1994) with box grooves was obtained and was mounted in a Miyamae driving machine. The club face was oriented for a square hit. The forward/backward tee position was adjusted so that the tee was four inches behind the point in the downswing where the club was vertical. The height of the tee and the toe-heel position of the club relative to the tee were adjusted in order that the center of the impact mark was about ¾ of an inch above the sole and was centered toe to heel across the face. The machine was operated at a club head speed of 125 feet per second. A minimum of three samples of each ball were tested. Each ball was hit three times.

After testing, the balls were rated according to the following table:

| Rating | Type of damage |
|---|---|
| 1 | Little or no damage (groove markings or dents) |
| 2 | Small cuts and/or ripples in cover |
| 3 | Moderate amount of material lifted from ball surface but still attached to ball |
| 4 | Material removed or barely attached |

The balls that were tested were primed and top coated.

As shown on Table 11, many of the cover materials resulted in golf balls having a scuff resistance of 1.5 or less, and others had a scuff resistance rating of 1.5–2.5.

COMPARATIVE EXAMPLE 4

Hard/Soft Ionomer Blend

A golf ball with a cover formed from a blend of a commercially available hard sodium ionomer and a commercially available soft acrylate ester-containing zinc ionomer in which the blend contains less than 60 wt % soft ionomer was subjected to the same testing as the golf balls of Example 2. The results are shown on Table 11.

TABLE 11

| Experiment No. | Cover Material | Cation | % Neutralization | PGA Comp. | COR (×1000) | Shore D Hardness | Scuff Resist. | Spin Rate (#9 Iron at 105 ft/sec) |
|---|---|---|---|---|---|---|---|---|
| Comp. 4 | hard-soft ionomer blend 1 (control) | Zn/Na | 60% | 90 | 787 | 58 | 4.0 | 9,859 |
| 2-1 | ATX 325 | Li | 57% | 86 | 787 | 51 | 1.0 | 10,430 |
| 2-2 | ATX 325 | Li/Zn/K | 65% | 86 | 787 | 50 | 1.0 | 10,464 |
| 2-3 | ATX 320 | Li | 57% | N.T. | N.T. | 56 | 1.0 | 10,299 |
| 2-4 | ATX 320 | Li/Zn/K | 65% | 87 | 790 | 55 | 1.5 | 10,355 |
| 2-5 | Nucrel 010 | Li | — | 89 | 803 | 65 | 3.0 | 7,644 |
| 2-6 | Nucrel 010 | Li/Zn/K | — | 89 | 802 | 65 | 4.0 | 7,710 |
| 2-7 | Nucrel 035 | Li | — | 87 | 801 | 62 | 3.0 | 8,931 |
| 2-8 | Nucrel 035 | Li/Zn/K | — | 87 | 798 | 62 | 3.0 | 8,915 |
| 2-9 | ATX 310 | Li | 53% | 88 | 802 | 62 | 2.5 | 8,892 |
| 2-10 | ATX 310 | Li/Zn/K | 60% | 88 | 801 | 63 | 2.5 | 8,244 |
| 2-11 | ATX 325 | Li | 57% | 83 | 797 | 55 | 1.5 | — |
| 2-12 | ATX 325 | Li/Zn/K | 65% | 82 | 796 | 53 | 1.5 | — |
| 2-13 | 50% ATX 325-Li 50% ATX 320-unneut. | (Li) | 28.5% | 89 | 777 | 50 | 1.5 | — |
| 2-14 | 75% ATX320-Li/Zn/K 25% ATX320-unneut. | (Li/Zn/K) | 49% | 87 | 776 | 54 | 1.5 | — |
| 2-15 | 60% ATX325-Li/Zn/K 40% Primacor 3440-unneut. | (Li/Zn/K) | 39% | 88 | 779 | 54 | 1.5 | — |
| 2-16 | ATX 320 | Unneut. | — | 88 | 775 | 45 | 2.0 | — |
| 2-17 | ATX 325 | Unneut. | — | 88 | — | 42 | 1.5 | — |
| 2-18 | ATX 325 | Li | 50% | 95 | 795 | 50 | 1.0 | — |
| 2-19 | ATX 325 | Li | 30% | 96 | 791 | 46 | 1.5 | — |
| 2-20 | ATX 325 | Li/Zn/K | 50% | 91 | 791 | 48 | 1.0 | — |
| 2-21 | ATX 325 | Li/Zn/K | 30% | 90 | N.T. | 45 | 1.0 | — |
| 2-22 | ATX 325 | Li/Zn/K | 50% | 91 | N.T. | 47 | 1.0 | — |

EXAMPLE 3

Ionic Terpolymers

The procedure of Example 2 was repeated with the exception that single cations of lithium, magnesium, sodium and potassium were used in the cover material. The results are shown on Table 12.

As indicated on Table 12, the scuff resistance of the golf balls was 3.0 or better. The scuff resistance of the balls with covers made of an acrylic acid terpolymer was 1.0. For a given terpolymer, the scuff resistance did not change when different cations were used for neutralization.

TABLE 12

| Experiment No. | Cover Material | Cation | % Neutralization | PGA Comp. | COR (×1000) | Shore D Hardness | Scuff Resistance |
|---|---|---|---|---|---|---|---|
| 3-1 | Nucrel 035 | Li | 100 | 90 | 792 | 62 | 3.0 |
| 3-2 | Nucrel 035 | Mg | 100 | 89 | 792 | 62 | 3.0 |
| 3-3 | ATX 325 | Li | 100 | 86 | 790 | 51 | 1.0 |
| 3-4 | ATX 325 | Mg | 100 | 85 | 791 | 51 | 1.0 |
| 3-5 | ATX 325 | Na | 81 | 85 | 790 | 51 | 1.0 |
| 3-6 | ATX 325 | K | 95 | 85 | 791 | 51 | 1.0 |

COMPARATIVE EXAMPLE 5

Several intermediate balls (cores plus inner cover layers) were prepared in accordance with conventional molding procedures described above. The inner cover compositions were molded around 1.545 inch diameter cores weighing 36.5 grams with a specific gravity of about 1.17 such that the inner cover had a wall thickness of about 0.0675 inches and a specific gravity of about 0.95, with the overall ball measuring about 1.680 inches in diameter.

The cores utilized in the examples were comprised of the following ingredients: 100 parts by weight high cis-polybutadiene, 31 parts by weight zinc diacrylate, about 6 parts by weight zinc oxide, 20 parts by weight zinc stearate, 17–18 parts by weight calcium carbonate, and small quantities of peroxide, coloring agent and a polymeric isocyanate sold as Papi 94 (Dow Chemical Co.). The molded cores exhibited PGA compressions of about 100 and C.O.R. values of about 0.800.

The inner cover compositions designated herein as compositions A–E utilized to formulate the intermediate balls are set forth in Table 10 below. The resulting molded intermediate balls were tested to determine the individual compression (Riehle), C.O.R., Shore C hardness, spin rate and cut resistance properties. These results are also set forth in Table 10 below.

The data of these examples are the average of twelve intermediate balls produced for each example. The properties were measured according to the following parameters:

Cut resistance was measured in accordance with the following procedure: A golf ball was fired at 135 feet per second against the leading edge of a pitching wedge wherein the leading edge radius is $1/32$ inch, the loft angle is 51 degrees, the sole radius is 2.5 inches and the bounce angle is 7 degrees.

The cut resistance of the balls tested herein was evaluated on a scale of 1 to 5. The number 1 represents a cut that extends completely through the cover to the core. A 2 represents a cut that does not extend completely through the cover but that does break the surface. A 3 does not break the surface of the cover but does leave a permanent dent. A 4 leaves only a slight crease which is permanent but not as severe as 3. A 5 represents virtually no visible indentation or damage of any sort.

The spin rate of the golf ball was measured by striking the resulting golf balls with a pitching wedge or 9 iron wherein the club head speed is about 105 feet per second and the ball is launched at an angle of 26 to 34 degrees with an initial velocity of about 110 to 115 feet per second. The spin rate was measured by observing the rotation of the ball in flight using stop action Strobe photography.

Initial velocity is the velocity of a ball when struck at a hammer speed of 143.8 feet per second in accordance with a test as prescribed by the U.S.G.A.

As will be noted, compositions A, B and C include high acid ionomeric resins, with composition B further including zinc stearate. Composition D represents the inner layer (i.e. Surlyn® 1605) used in U.S. Pat. No. 4,431,193. Composition E provides a hard, low acid ionomeric resin.

The purpose behind producing and testing the balls of Table 13 was to provide a subsequent comparison in properties with the multi-layer golf balls of the present invention.

TABLE 13

| Molded Intermediate Golf Balls | | | | | |
|---|---|---|---|---|---|
|  | A | B | C | D | E |
| Ingredients of Inner Cover Compositions | | | | | |
| Iotek 959 | 50 | 50 | — | — | — |
| Iotek 960 | 50 | 50 | — | — | — |
| Zinc Stearate | — | 50 | — | — | — |
| Surlyn ® 8162 | — | — | 75 | — | — |
| Surlyn ® 8422 | — | — | 25 | — | — |
| Surlyn ® 1605 | — | — | — | 100 | — |
| Iotek 7030 | — | — | — | — | 50 |
| Iotek 8000 | — | — | — | — | 50 |
| Properties of Molded Intermediate Balls | | | | | |
| Compression | 58 | 58 | 60 | 63 | 62 |
| C.O.R. | .811 | .810 | .807 | .793 | .801 |
| Shore C Hardness | 98 | 98 | 97 | 96 | 96 |
| Spin Rate (R.P.M.) | 7,367 | 6,250 | 7,903 | 8,337 | 7,956 |
| Cut Resistance | 4–5 | 4–5 | 4–5 | 4–5 | 4–5 |

As shown in Table 13 above, the high acid ionomer resin inner cover layer (molded intermediate balls A–C) have lower spin rates and exhibit substantially higher resiliency characteristics than the low acid ionomer resin based inner cover layers of balls D and E.

EXAMPLE 4

Multi-layer balls in accordance with the present invention were then prepared. Specifically, the inner cover compositions used to produce intermediate golf balls from Table 13 were molded over the solid cores to a thickness of about 0.0375 inches, thus forming the inner layer. The diameter of the solid core with the inner layer measured about 1.620 inches. Alternatively, the intermediate golf balls of Table 13 were ground down using a centerless grinding machine to a size of 1.620 inches in diameter to produce an inner cover layer of 0.0375 inches.

The size of 1.620 inches was determined after attempting to mold the outer cover layer to various sizes (1.600", 1.610", 1.620", 1.630" and 1.640") of intermediate (core plus inner layer) balls. It was determined that 1.620" was about the largest "intermediate" ball (i.e., core plus inner layer) which could be easily molded over with the soft outer layer materials of choice. The goal herein was to use as thin an outer layer as necessary to achieve the desired playability characteristics while minimizing the cost of the more expensive outer materials. However, with a larger diameter final golf ball and/or if the cover is compression molded, a thinner cover becomes feasible.

With the above in mind, an outer cover layer composition was blended together in accordance with conventional blending techniques. The outer layer composition used for this portion of the example is a relatively soft cover composition such as those listed in U.S. Pat. No. 5,120,791. An example of such a soft cover composition is a 45% soft/55% hard low acid ionomer blend designated by the inventor as "TE-90". The composition of TE-90 is set forth as follows:

| Outer Cover Layer Composition TE-90 | |
|---|---|
| Iotek 5000 | 22.7 weight % |
| Iotek 7030 | 22.7 weight % |
| Iotek 7520 | 45.0 weight % |
| White MB[1] | 9.6 weight % |

[1]White MB consists of about 23.77 weight percent $TiO_2$; 0.22 weight percent Uvitex OB, 0.03 weight percent Santonox R, 0.05 weight percent Ultramarine blue and 75.85 weight percent Iotek 7030.

The above outer layer composition was molded around each of the 1.620 diameter intermediate balls comprising a core plus one of compositions A–D, respectively. In addition, for comparison purposes, Surlyn® 1855 (new Surlyn® 9020), the cover composition of the '193 patent, was molded about the inner layer of composition D (the intermediate ball representative of the '193 patent). The outer layer TE-90 was molded to a thickness of approximately 1.680 inches in diameter. The resulting balls (a dozen for each example) were tested and the various properties thereof are set forth in Table 14 as follows:

TABLE 14

| | Finished Balls | | | | |
|---|---|---|---|---|---|
| Ingredients: | 1 | 2 | 3 | 4 | 5 |
| Inner Cover Composition | A | B | C | D | D |
| Outer Cover Composition | TE-90 | TE-90 | TE-90 | TE-90 | Surlyn® 9020 |

TABLE 14-continued

| | Finished Balls | | | | |
|---|---|---|---|---|---|
| Ingredients: | 1 | 2 | 3 | 4 | 5 |
| Properties of Molded Finished Balls: | | | | | |
| Compression | 63 | 63 | 69 | 70 | 61 |
| C.O.R. | .784 | .778 | .780 | .770 | .717 |
| Shore C Hardness | 88 | 88 | 88 | 88 | 89 |
| Spin (R.P.H.) | 8,825 | 8,854 | 8,814 | 8,990 | 8,846 |
| Cut Resistance | 3–4 | 3–4 | 3–4 | 3–4 | 1–2 |

As it will be noted in finished balls 1–4, by creating a multi-layer cover utilizing the high acid ionomer resins in the inner cover layer and the hard/soft low acid ionomer resin in the outer cover layer, higher compression and increased spin rates are noted over the single layer covers of Table 10. In addition, both the C.O.R. and the Shore C hardness are reduced over the respective single layer covers of Table 10. This was once again particularly true with respect to the multi-layered balls containing the high acid ionomer resin in the inner layer (i.e. finished balls 1–5). In addition, with the exception of prior art ball 5 (i.e. the '193 patent), resistance to cutting remains good but is slightly decreased.

Furthermore, it is also noted that the use of the high acid ionomer resins as the inner cover material produces a substantial increase in the finished balls overall distance properties. In this regard, the high acid ionomer resin inner covers of balls 1–3 produce an increase of approximately 10 points in C.O.R. over the low acid ionomer resin inner covers of balls 4 and about a 25 point increase over the prior art balls 5. Since an increase in 3 to 6 points in C.O.R. results in an average increase of about 1 yard in distance, such an improvement is deemed to be significant.

Several other outer layer formulations were prepared and tested by molding them around the core and inner cover layer combination to form balls each having a diameter of about 1.68 inches. First, B.F. Goodrich Estane® X-4517 polyester polyurethane was molded about the core molded with inner layer cover formulation A. DuPont Surlyn® 9020 was molded about the core which was already molded with inner layer D. Similar properties tests were conducted on these golf balls and the results are set forth in Table 15 below:

TABLE 15

| | Finished Balls | |
|---|---|---|
| Ingredients: | 6 | 7 |
| Inner Cover Layer Composition | A | D |
| Outer Cover Layer Composition | Estane® 4517 | Surlyn® 9020 |
| Properties of Molded Finished Balls: | | |
| Compression | 67 | 61 |
| C.O.R. | .774 | .757 |
| Shore C Hardness | 74 | 89 |
| Spin (R.P.M.) | 10,061 | 8,846 |
| Cut Resistance | 3–4 | 1–2 |

The ball comprising inner layer formulation D and Surlyn® 9020 identifies the ball in the Nesbitt U.S. Pat. No. 4,431,193. As is noted, the example provides for relatively high softness and spin rate though it suffers from poor cut resistance and low C.O.R. This ball is unacceptable by today's standards.

As for the Estane® X4517 polyester polyurethane, a significant increase in spin rate over the TE-90 cover is noted along with an increase in spin rate over the TE-90 cover is noted along with an increased compression. However, the C.O.R. and Shore C values are reduced, while the cut resistance remains the same. Furthermore, both the Estane®

X-4517 polyester polyurethane and the Surlyn® 9020 were relatively difficult to mold in such thin sections.

EXAMPLE 5

In order to analyze the change in characteristics produced by multi-layer golf balls (standard size) having inner cover layers comprised of ionomer resin blends of different acid levels, a series of experiments was run. A number of tests were performed, varying the type of core, inner cover layer and outer cover layer. The results are shown below on Table 16:

Furthermore, the low acid ionomer formulation for "SD 90" and "Z-Balata" are set forth below:

| SD Cover | ZB Cover |
|---|---|
| 17.2% Surlyn 8320 | 19% Iotek 8000 |
| 7.5% Surlyn 8120 | 19% Iotek 7030 |
| 49% Surlyn 9910 | 52.5% Iotek 7520 |
| 16.4% Surlyn 8940 | 9.5% white MB |
| 9.7% white MB | |

The data clearly indicates that higher C.O.R. and hence increase travel distance can be obtained by using multi-layered covered balls versus balls covered with single layers. However, some sacrifices in compression and spin are also noted. Further, as shown in comparing Example Nos. 12 vs. 13, Example Nos. 17 vs. 16, etc. use of lower acid level inner cover layers and relatively soft outer cover layers (i.e., 50 wt. % or more soft ionomer) produces softer compression and higher spin rates than the golf balls comprised of high acid inner cover layers. Consequently, use of blends of low acid ionomer resins to produce the inner layer of a multi-

TABLE 16

| Sample # | CORE | INNER LAYER | THICKNESS | COMP/ CDR | OUTER COVER | THICKNESS | COMP (Rhiele) | COR | SHORE D | SPIN |
|---|---|---|---|---|---|---|---|---|---|---|
| 8 | 1042 YELLOW | NONE | — | SEE BELOW | TOP GRADE | 0.055" | 61 | .800 | 68 | 7331 |
| 9 | 1042 YELLOW | NONE | — | SEE BELOW | 959/960 | 0.055" | 56 | .808 | 73 | 6516 |
| 10 | SPECIAL 1.47" | 959/960 | 0.050" | 65/.805 | 959/960 | 0.055" | 48 | .830 | 73 | 6258 |
| 11 | 1042 YELLOW | NONE | — | SEE BELOW | SD 90 | 0.005" | 62 | .792 | 63 | 8421 |
| 12 | SPECIAL 1.47" | TOP GRADE | 0.050" | 66/.799 | SD 90 | 0.055" | 55 | .511 | 63 | 8265 |
| 13 | SPECIAL 1.47" | 959/960 | 0.050" | 65/.805 | SD 90 | 0.055" | 53 | .813 | 63 | 8254 |
| 14 | SPECIAL 1.47" | TOP GRADE | 0.050" | 66/.799 | TOP GRADE | 0.055" | 51 | .819 | 68 | 7390 |
| 15 | 1042 YELLOW | NONE | — | SEE BELOW | 2-BALATA | 0.055" | 67 | .782 | 55 | 9479 |
| 16 | SPECIAL 1.47" | 959/960 | 0.050" | 65/.805 | 2-BALATA | 0.055" | 61 | .800 | 55 | 9026 |
| 17 | SPECIAL 1.47" | TOP GRADE | 0.050" | 66/.799 | 2-BALATA | 0.055" | 60 | .798 | 55 | 9262 |

1042 YELLOW>COMP = 72, COR = .780
SPECIAL 1.47" CORE>COMP = 67, COR = .782

In this regard, "Top Grade" or "TG" is a low acid inner cover ionomer resin blend comprising of 70.6% Iotek 8000, 19.9% Iotek 7010 and 9.6% white masterbatch. "959/960" is a 50/50 wt/wt blend of Iotek 959/960. In this regard, Escor® or Iotek 959 is a sodium ion neutralized ethylene-acrylic neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectively. The physical properties of these high acid acrylic acid based ionomers are as follows:

| PROPERTY | ESCOR® (IOTEK) 959 | ESCOR® (IOTEK) 960 |
|---|---|---|
| Melt Index g/10 min | 2.0 | 1.8 |
| Cation | Sodium | Zinc |
| Melting Point, ° F. | 172 | 174 |
| Vicat Softening Point, ° F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 86,000 | 27,000 | layer covered golf ball, produces not only enhanced travel distance but also enhanced compression and spin properties.

EXAMPLE 6

Multi-layer oversized golf balls were produced utilizing different ionomer resin blends as the inner cover layer (i.e., core plus inner cover layer is defined as "mantle"). The "ball data" of the oversized multi-layer golf balls in comparison with production samples of "Top-Flite® XL" and Top-Flite® Z-Balata" is set forth below.

The results indicate that use of multi-layer covers enhances C.O.R. and travel distance. Further, the data shows that use of a blend of low acid ionomer resins (i.e., "Top Grade") to form the inner cover layer in combination with a soft outer cover ("ZB" or "SD") produces enhanced spin and compression characteristics. The overall combination results in a relatively optimal golf ball with respect to characteristics of travel distance, spin and durability.

EXAMPLE 7

Golf balls 7-1, 7-2, 7-3 and 7-4 having the formulations shown on Table 17 were formed.

TABLE 17

| Chemical Component | 7-1 | 7-2 | 7-3 | 7-4 |
|---|---|---|---|---|
| Core Data | | | | |
| Size | 1.47" | 1.47" | 1.47" | 1.47" |
| Weight | 32.7 g | 32.7 g | 32.7 g | 32.7 g |
| PGA Compression | 70 | 60 | 70 | 60 |
| COR | 760 | 770 | 780 | 770 |
| Composition | | | | |
| High cis polybutadiene | 100 | 100 | 100 | 100 |
| Zinc oxide | 30.5 | 31.6 | 30.5 | 31.6 |
| Core regrind | 16 | 16 | 16 | 16 |
| Zinc Stearate | 16 | 16 | 16 | 16 |
| Zinc Diacrylate | 22 | 20 | 22 | 20 |
| Initiator | 0.9 | 0.9 | 0.9 | 0.9 |
| Inner Cover Layer | | | | |
| Size | 1.57" | 1.57" | 1.57" | 1.57" |
| Weight | 38.4 g | 38.4 g | 38.4 g | 38.4 g |
| PGA Compression | 83 | 75 | 83 | 75 |
| COR | 801 | 795 | 801 | 795 |
| Thickness | 0.050" | 0.050" | 0.050" | 0.050" |
| Hardness (Shore C/D) | 97/70 | 97/70 | 97/70 | 97/70 |
| Composition | | | | |
| Iotek 1002 | 50% | 50% | 50% | 50% |
| Iotek 1003 | 50% | 50% | 50% | 50% |
| Outer Cover Layer | | | | |
| Hardness (Shore C/D) | 71/46 | 71/46 | 71/46 | 71/46 |
| Thickness | 0.055" | 0.055" | 0.055" | 0.055" |
| Composition | | | | |
| Iotek 7510 | 92.8% | 92.8% | 42% | 42% |
| Iotek 7520 | | | 42% | 42% |
| Iotek 7030 | 7.2% | 7.2% | 7.3% | 7.3% |
| Iotek 8000 | | | 8.7% | 8.7% |
| Whitener Package | | | | |
| Unitane 0-110 | 2.3 phr | 2.3 phr | 2.3 phr | 2.3 phr |
| Eastobrite OB1 | 0.025 phr | 0.025 phr | 0.025 phr | 0.025 phr |
| Ultra Marine Blue | 0.042 phr | 0.042 phr | 0.042 phr | 0.042 phr |
| Santanox R | 0.004 phr | 0.004 phr | 0.004 phr | 0.004 phr |
| Final Ball Data | | | | |
| Size | 1.68" | 1.68" | 1.68" | 1.68" |
| Weight | 45.4 g | 45.4 g | 45.4 g | 45.4 g |

TABLE 17-continued

| Chemical Component | 7-1 | 7-2 | 7-3 | 7-4 |
|---|---|---|---|---|
| PGA Compression | 85 | 78 | 85 | 78 |
| COR | 793 | 785 | 793 | 785 |

The balls of Example 7-2 were tested by a number of professional quality golfers using a driver, 5-iron, 9-iron, and sand wedge or pitching wedge. Each player used his own clubs and hit both the ball of Example 7-2 and a control ball, which was the 1995 two-piece Top-Flite Tour Z-balata 90. The Z-balata 90 has a 1.545" core of about 36.89 with a PGA compression of about 80 and a COR of about 0.794. The cover of the Z-balata 90 is about 0.068 in. thick, and is a blend of Iotek 8000 and Iotek 7510 with or without masterbatch containing Iotek 7030. The cover has a shore D hardness of about 55. The ball has a PGA compression of about 79 and a COR of about 0.788. Each player hit six of the balls of Example 7-2 and six Z-balata control balls one time each. For each shot, measurements were made of the initial launch conditions of the golf ball, including launch angle and ball speed. Furthermore, spin rates at initial launch, carry distance, and total distance were measured. The players hit full shots with the driver (1W), 5-iron (5I) and 9-iron (9I). With the sand wedge or pitching wedge (SW), the players hit about 30 yard chip shots. Data points were removed if determined to be "wild points." A point was said to be wild if it fell outside 2 standard deviations of the 6-hit average. Initial launch conditions were determined using a highly accurate high speed stop action video photography system. The results are shown on Table 18.

As shown on Table 18, multi-layer ball 7-2 was longer than the Z-balata control when hit with a 5-iron but only slightly longer than the Z-balata ball using a driver and 9-iron. The multi-layer ball 7-2 and the two-piece control were generally the same in overall distance using a driver. In each case, the multi-layer ball 7-2 had a higher spin rate off the 30-yard chip shot than the Z-balata. The spin rate of the ball of Example 7-2 was an average of 11.6% higher than the spin rate of the Z-balata control in the 30 yard chip shot.

TABLE 18

| | | 2-Piece Control | | | | | 7-2 | | | |
|---|---|---|---|---|---|---|---|---|---|---|
| Player | Club | LA (deg) | B.S. (fps) | Spin (rpm) | Carry (yds) | Total (yds) | L.A. (deg) | B.S. (fps) | Spin (rpm) | Carry (yds) | Total (yds) |
| 1 | 1W | 10.4 | 262.2 | 3537 | 272.5 | 288.9 | 10.0 | 262.3 | 3247 | 271.6 | 292.2 |
| 2 | 1W | 9.5 | 240.1 | 3124 | 238.1 | 253.6 | 8.9 | 238.3 | 2935 | 236.3 | 257.4 |
| 3 | 1W | 8.6 | 258.8 | 3695 | 254.1 | 259.9 | 6.3 | 251.2 | 3357 | 247.6 | 260.8 |
| 4 | 1W | 10.9 | 252.6 | 2639 | 271.6 | 289.8 | 12.5 | 251.4 | 3066 | 279.0 | 296.7 |
| 5 | 1W | 9.5 | 211.7 | 3627 | 237.2 | 255.2 | 9.4 | 208.7 | 3415 | 235.0 | 259.8 |
| 6 | 1W | 10.2 | 242.0 | 3105 | 263.8 | 283.2 | 11.0 | 243.9 | 2903 | 267.6 | 288.4 |
| 7 | 1W | 11.5 | 214.9 | 3089 | 265.4 | 279.0 | 11.6 | 212.6 | 3165 | 262.9 | 274.4 |
| 8 | 1W | 9.7 | 239.5 | 3129 | 263.6 | 288.8 | 9.3 | 235.3 | 2884 | 257.2 | 276.8 |
| 9 | 1W | 11.7 | 211.2 | 2939 | 231.4 | 255.8 | 11.3 | 208.5 | 2032 | 222.2 | 244.3 |
| 10 | 1W | 10.2 | 244.0 | 2797 | 243.3 | 250.2 | 9.7 | 239.6 | 3072 | 236.8 | 251.1 |
| 11 | 1W | | | | 247.4 | 263.8 | 13.8 | 215.8 | 3916 | 245.4 | 268.8 |
| AVE. | | 10.2 | 237.7 | 3168 | 253.5 | 269.8 | 10.3 | 233.4 | 3090 | 251.1 | 270.1 |
| 1 | 5I | 12.4 | 207.3 | 5942 | 198.3 | 209.8 | 11.8 | 206.3 | 5507 | 196.2 | 207.8 |
| 2 | 5I | | | | 178.3 | 184.2 | 14.9 | 199.4 | 5094 | 182.2 | 187.8 |
| 3 | 5I | 10.9 | 196.8 | 6462 | 185.2 | 188.9 | 11.5 | 197.0 | 6009 | 187.4 | 193.4 |
| 4 | 5I | 14.4 | 205.5 | 6683 | 207.8 | 213.7 | 14.7 | 208.3 | 6601 | 207.5 | 217.8 |
| 5 | 5I | 13.6 | 183.2 | 6734 | 182.9 | 189.4 | 14.2 | 180.9 | 6380 | 184.2 | 190.7 |
| 6 | 5I | 12.4 | 204.5 | 5771 | 201.0 | 210.5 | 12.9 | 206.4 | 5414 | 206.0 | 218.3 |
| 7 | 5I | 14.1 | 184.3 | 6013 | 194.8 | 198.1 | 13.1 | 182.7 | 6000 | 192.9 | 200.0 |
| 8 | 5I | 12.8 | 187.2 | 6149 | 188.0 | 200.3 | 13.1 | 191.6 | 6183 | 191.7 | 202.0 |

TABLE 18-continued

2-Piece Control         7-2

| Player | Club | LA (deg) | B.S. (fps) | Spin (rpm) | Carry (yds) | Total (yds) | L.A. (deg) | B.S. (fps) | Spin (rpm) | Carry (yds) | Total (yds) |
|---|---|---|---|---|---|---|---|---|---|---|---|
| 9 | 51 | 13.2 | 176.5 | 6000 | 168.2 | 173.7 | 13.6 | 172.5 | 6166 | 169.7 | 174.3 |
| 10 | 51 | 13.9 | 199.9 | 7214 | 175.2 | 178.2 | 14.9 | 199.1 | 6237 | 169.0 | 170.2 |
| 11 | 51 | 14.2 | 179.5 | 6669 | 181.9 | 187.8 | 15.7 | 181.2 | 5338 | 184.0 | 190.7 |
| AVE. | | 13.2 | 192.5 | 6364 | 187.4 | 194.1 | 13.7 | 193.4 | 5903 | 188.4 | 195.7 |
| 1 | 91 | 20.0 | 168.1 | 9865 | 152.5 | 159.5 | 20.4 | 172.2 | 9210 | 153.4 | 159.6 |
| 2 | 91 | 21.8 | 165.9 | 9770 | 132.7 | 137.0 | 23.0 | 164.7 | 8949 | 132.7 | 134.6 |
| 3 | 91 | 19.9 | 154.3 | 10764 | 128.8 | 134.3 | 19.9 | 156.5 | 10161 | 129.8 | 135.0 |
| 4 | 91 | 22.7 | 166.4 | 10551 | 146.0 | 146.8 | 23.9 | 165.7 | 9990 | 150.3 | 154.2 |
| 5 | 91 | 22.1 | 147.4 | 9662 | 137.1 | 138.1 | 22.2 | 148.5 | 9324 | 139.3 | 141.7 |
| 6 | 91 | 19.4 | 189.7 | 8939 | 153.3 | 158.0 | 19.7 | 168.2 | 8588 | 156.2 | 163.5 |
| 7 | 91 | 20.4 | 151.1 | 9899 | 147.5 | 150.0 | 21.6 | 150.3 | 9084 | 148.6 | 151.3 |
| 8 | 91 | 18.5 | 143.0 | 9408 | 142.0 | 147.5 | 18.3 | 141.8 | 9038 | 1412 | 144.8 |
| 9 | 91 | 20.0 | 134.5 | 9124 | 124.9 | 128.8 | 20.1 | 132.9 | 8834 | 125.0 | 128.9 |
| 10 | 91 | 23.2 | 156.1 | 10503 | 122.7 | 124.1 | 23.2 | 155.6 | 11017 | 116.2 | 116.3 |
| 11 | 91 | 21.5 | 149.4 | 9729 | 131.0 | 134.5 | 23.4 | 151.7 | 8686 | 133.3 | 136.8 |
| AVE. | | 20.9 | 155.1 | 9849 | 138.0 | 141.9 | 21.4 | 155.3 | 9353 | 138.7 | 142.4 |
| 1 | SW | 29.2 | 56.4 | 5547 | | | 24.8 | 58.9 | 6679 | | |
| 2 | SW | 26.6 | 57.4 | 5446 | | | 25.2 | 57.8 | 5647 | | |
| 3 | SW | 25.8 | 64.1 | 4925 | | | 24.3 | 63.5 | 5550 | | |
| 4 | SW | 30.9 | 60.9 | 5837 | | | 31.1 | 57.9 | 6156 | | |
| 5 | SW | 20.3 | 56.7 | 4152 | | | 19.0 | 56.3 | 4288 | | |
| 6 | SW | 34.3 | 57.1 | 3798 | | | 32.4 | 61.5 | 4700 | | |
| 7 | SW | 30.5 | 51.5 | 4712 | | | 29.3 | 52.3 | 5374 | | |
| AVE. | | 28.2 | 67.7 | 4931 | | | 26.6 | 58.3 | 6485 | | |

EXAMPLE 8

The ball of Example 7-2 was compared to a number of competitive products in distance testing using a driving machine in which the ball was struck with a club. The results are shown on Table 19 below. The distance test shows that Example 7-2 is about the same distance as the Z-balata 90 control and longer than the Titleist HP-2 Tour (soft covered two-piece) and Titleist Tour Balata 100 ball (Balata covered wound ball). The other balls that were tested include the Maxfli (Dunlop) XS100, Maxfli (Dunlop) XF100, and the GIGA Top-Flite golf ball sold by Spalding in Japan. In Table 19, the ball of Example 7-2 is the longest ball.

Distance Report

Test Number: 131951  Club Head Speed: 157.35
Club Name: TFT 10.5 DEG MW (DRIVER)  No. Balls/Type: 10

Average Test Conditions:

Launch Angles (Deg.): 9.6
Ball Speed (fps): 217.8
Spin Rate (rpm): 3390
Turf Condition: FIRM
Wind (mph/dir): 2.55  135.20
Temp./RH (deg/%): 0.61  91.59
P-Bar (mbar): 1015

| Ball Type | Traj | PTime | Carry | Car Diff | Ctr Dev | Roll | T Dist | T Diff |
|---|---|---|---|---|---|---|---|---|
| HP2TOUR | 8.7 | 6.0 | 230.4 | −4.1 | 3.0 | 9.9 | 240.3 | −4.3 |
| ZB90 | 9.0 | 6.1 | 231.8 | −2.7 | 5.4 | 9.1 | 241.0 | −3.6 |
| GIGA | 8.8 | 6.0 | 234.5 | 0.0 | 5.7 | 10.2 | 244.6 | 0.0 |
| Example 7-2 | 8.3 | 5.9 | 229.6 | −4.9 | 3.8 | 11.1 | 240.7 | −3.9 |
| Titleist Tour Balata 100 | 9.2 | 6.2 | 229.2 | −5.3 | 7.8 | 7.8 | 236.9 | −7.7 |

Distance Report

Test Number: 0203963  Club Head Speed: 126.18
Club Name: TFT 5 IRON  No. Balls/Type: 12

Average Test Conditions:

Launch Angles (Deg.): 14
Ball Speed (fps): 180.1
Spin Rate (rpm): 5424
Turf Condition: FIRM
Wind (mph/dir): 6.23  171.38
Temp./RH (deg/%): 62.20  98.16
P-Bar (mbar): 1015

| Ball Type | Traj | PTime | Carry | Car Diff | Ctr Dev | Roll | T Dist | T Diff |
|---|---|---|---|---|---|---|---|---|
| HP2TOUR | 25.3 | 6.0 | 156.0 | −7.4 | −3.0 | 1.5 | 157.5 | −9.5 |
| ZB90 | 25.2 | 6.0 | 157.1 | −6.3 | −3.3 | 2.2 | 159.3 | −7.7 |
| GIGA | 25.0 | 6.0 | 162.2 | −1.2 | −3.1 | 2.9 | 165.1 | −1.9 |
| Example 7-2 | 23.5 | 6.0 | 163.4 | 0.0 | −3.3 | 3.7 | 167.0 | 0.0 |
| Titleist Tour Balata 100 | 23.9 | 6.0 | 158.7 | −4.7 | −2.3 | 2.5 | 161.2 | −5.8 |
| ZB 100 | 26.1 | 6.0 | 155.6 | −7.8 | −4.5 | 2.0 | 157.6 | −9.4 |
| XS 100 | 23.9 | 6.0 | 161.3 | −2.3 | −5.6 | 2.6 | 163.9 | −3.1 |
| XF 100 | 24.5 | 6.0 | 152.0 | −11.4 | −62 | 1.6 | 153.7 | −13.3 |

EXAMPLE 9

A number of golf ball cores having the following formulation were made:

| | PARTS |
|---|---|
| High-cis polybutadiene | 100 |
| Zinc oxide | 30 |
| Core regrind | 18 |
| Zinc stearate | 16 |

-continued

| PARTS | |
|---|---|
| Zinc diacrylate | 21 |
| Peroxide (231 xl) | 0.9 |

The cores had a diameter of 1.470", a weight of 32.5 g, a PGA compression of 57 and a COR of 0.768.

The cores were divided into four sets and each set was covered with one of the mantle formulations shown below on Table 22.

TABLE 22

MANTLE FORMULATIONS

| Mantle Type | A | B | C | D (control) |
|---|---|---|---|---|
| Surlyn 8940 (g) | 656 | 880 | 1610 | — |
| Surlyn 9910 (g) | 1964 | 2180 | 535 | — |
| Surlyn 8120 (g) | 300 | 160 | 475 | — |
| Surlyn 8320 (g) | 700 | 400 | 1000 | — |
| Iotek 7030 (g) | 380 | 380 | 380 | — |
| Iotek 1002 (g) | — | — | — | 2000 |
| Iotek 1003 (g) | — | — | — | 2000 |

The mantle covered cores had the following physical properties:

TABLE 23

MANTLE-COVERED CORES

| | A | B | C | D |
|---|---|---|---|---|
| Size (Pole) (Inches) | 1.577 | 1.576 | 1.572 | 1.573 |
| Weight (g) | 38.6 | 38.5 | 38.3 | 38.4 |
| PGA Compression | 71 | 74 | 70 | 76 |
| COR | .7795 | .7831 | .7768 | .7946 |
| Std. Dev. COR | .0051 | .0026 | .0016 | .0012 |
| Shore C | 92 | 94 | 90 | 97 |
| Shore D | 62 | 65 | 61 | 70 |

Each set of mantle-covered cores was divided into three subsets and a cover layer having one of the cover formulations shown below on Table 24 was formed over the mantled cores. The "whitener package" on Table 24 has the same formulation as that shown above on Table 19.

TABLE 24

COVER FORMULATIONS

| Cover Type | X | Y | Z |
|---|---|---|---|
| Iotek 7520 (g) | 1660 | 1480 | 1300 |
| Iotek 7510 (g) | 1660 | 1480 | 1300 |
| Iotek 8000 (g) | 304 | 664 | 1024 |
| Iotek 7030 (g) | 282 | 282 | 282 |
| Whitener package (g) | 94 | 94 | 94 |

The balls had the mantle and cover combinations and properties shown below on Table 25.

TABLE 25

BALL PROPERTIES

| Example No. | 9-1 | 9-2 | 9-3 | 94 | 9-5 | 9-6 | 9-7 | 9-8 | 9-9 | 9-10 | 9-11 | 9-12 |
|---|---|---|---|---|---|---|---|---|---|---|---|---|
| Mantle | A | A | A | B | B | B | C | C | C | D | D | D |
| Cover | X | Y | Z | X | Y | Z | X | Y | Z | X | Y | Z |
| Size (inch) | 1.6820 | 1.6820 | 1.6820 | 1.6820 | 1.6820 | 1.6820 | 1.6820 | 1.6820 | 1.6810 | 1.6820 | 1.6820 | 1.6810 |
| Weight (g) | 45.68 | 45.57 | 45.58 | 45.77 | 45.62 | 45.58 | 45.63 | 45.58 | 45.48 | 45.67 | 45.65 | 45.57 |
| PGA Comp. | 73.5 | 74.3 | 74.7 | 77.4 | 76.7 | 76.3 | 70.8 | 71.9 | 73.3 | 79.5 | 80 | 82.5 |
| COR | .7639 | .7665 | .7680 | .7701 | .7703 | .7704 | .7607 | .7630 | .7661 | .7771 | .7798 | .7839 |
| Std. Dev. COR | .0041 | .0027 | .0037 | .0077 | .0034 | .0023 | .0037 | .0030 | .0028 | .0034 | .0028 | .0020 |
| Shore C | 71 | 76 | 81 | 71 | 76 | 81 | 70 | 76 | 80 | 71 | 56 | 81 |
| Shore D | 46 | 50 | 53 | 46 | 50 | 53 | 46 | 49 | 52 | 47 | 51 | 53 |

Ball 9-10 was the control.

The results from Table 25 demonstrate that a multi-layer ball having a mantle hardness of 60D or greater (Ex. 9-7, 9-8, 9-9), and preferably 63D (Ex. 9-1, 9-2, 9-3) or greater give a ball having a COR of at least 0.761 (Ex. 9-7) and while a harder mantle (Ex. (94, 9-5, 9-6, 9-10, 9-11, 9-12) will generally give higher COR, it also contributes to a harder PGA compression. Versus the control ball (Ex. 9-10) it is demonstrated that softer compressions can be obtained with slightly softer mantles while maintaining a good COR. Likewise versus the control, higher COR balls may be designed (Ex. 9-11, 9-12) that still have a relatively soft compression for good feel.

EXAMPLE 10

A number of golf balls were made having the core and cover formulations and the physical properties shown on Tables 26 and 27. The balls of Examples 10-1, 10-2 and 10-5 are part of the invention. The balls of Examples 10-3, 10-4 and 10-6 are controls based upon the cover layer chemistry of comparative Example 2 of U.S. Pat. No. 5,586,950. The balls of Example 10-4 are replicas of comparative Example 2 of U.S. Pat. No. 5,586,950.

For all of the balls, the cores were molded and centerless ground to the appropriate size. The mantles of Examples 10-1 to 10-4 were injection molded in a 1.63" injection mold. The mantles for the balls of Examples 10-5 and 10-6 also were injection molded. All of the outer cover layers were injection molded.

TABLE 26

| | Ex. 10-1 | EX. 10-2 | EX. 103 | EX. 10-4 | EX. 10-5 | EX. 10-6 |
|---|---|---|---|---|---|---|
| Core Data | | | | | | |
| Core Type (see Table 2) | A | A | A | A | B | B |
| Core Size (in.) | 1.50 | 1.50 | 1.50 | 1.50 | 1.47 | 1.47 |
| Mantle Data | | | | | | |
| Ingredients | phr | phr | phr | phr | phr | phr |
| Iotek 1002 | 50 | — | 50 | — | 50 | 50 |
| Iotek 1003 | 50 | — | 50 | — | 50 | 50 |
| Surlyn 9910 | — | 50 | — | 50 | — | — |
| Surlyn 8940 | — | 35 | — | 35 | — | — |
| Surlyn 8920 | — | 15 | — | 15 | — | — |
| TiO$_2$ | 2 | 2 | 2 | 2 | — | — |
| Diameter (in.) | 1.625 | 1.625 | 1.625 | 1.625 | 1.57 | 1.57 |
| Thickness (in.) | 0.063 | 0.063 | 0.063 | 0.063 | 0.050 | 0.050 |
| Shore C/D Hardness (measured on ball) | 97/70 | 96/68 | 97/70 | 96/68 | 97/70 | 97/70 |
| Cover Data | | | | | | |
| Cover Type (see Table 2) | #1 | #2 | #2 | #2 | | |
| Size (in.) | 1.70 | 1.70 | 1.70 | 1.70 | 1.68 | 1.68 |
| Thickness (in.) | 0.038 | 0.038 | 0.038 | 0.038 | 0.055 | 0.055 |
| Shore C/D Hardness (measured on ball) | 75/49 | 75/49 | 84/57 | 83/57 | 72/48 | 83/56 |
| Compression (Riehle) | 63 | 66 | 60 | 63 | 83 | 80 |
| COR | 800 | 795 | 805 | 798 | 779 | 787 |

TABLE 27

| Core Formulations | | | Cover Formulations | | |
|---|---|---|---|---|---|
| Materials (phr) | A | B | Materials (phr) | #1 | #2 |
| BR 1220 (High cis polybutadiene) | 73 | 70 | Iotek 8000 | 8.5 | — |
| Taktene 220 (High cis polybutadiene) | 27 | 30 | Iotek 7510 | 41 | — |
| Zinc Oxide | 22.3 | 31.5 | Iotek 7520 | 41 | — |
| TG Regrind | 10 | 16 | Masterbatch C | 9.5 | — |
| Zinc Stearate | 20 | 16 | Surlyn 1557 | — | 10 |
| Zinc Diacrylate | 26 | 20 | Surlyn 1855 | — | 20 |
| Masterbatch A | 0.15 | — | Surlyn 8265 | — | 20 |
| Masterbatch B | — | 0.15 | Surlyn 8269 | — | 50 |
| Luperco 231 XL peroxide | 0.9 | 0.9 | TiO$_2$ | — | 2 |

Definitions

Coefficient of Restitution

As is apparent from the above discussions, two principal properties involved in golf ball performance are resilience and PGA compression. The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball-manufacturers. The factors or determinants of interest with respect to improved distance are generally the coefficient of restitution (COR) and the surface configuration (dimple pattern, ratio of land area to dimple area, etc.) of the ball.

The COR of solid core balls is a function of the composition of the core and of the cover. The core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers. The COR of the golf balls of the present invention is a function of the composition and physical properties of the core and cover layer materials such as flex modulus, hardness and particularly, their resilience, i.e. ability to quickly recover from a high impact deformation.

The coefficient of restitution is the ratio of the outgoing velocity to the incoming velocity. In the examples of this application, the coefficient of restitution of a golf ball was measured by propelling a ball horizontally at a speed of 125±5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

PGA Compression

PGA compression is another important property involved in the performance of a golf ball. The compression of the ball can affect the playability of the ball on striking and the sound or "click" produced. Similarly, compression can affect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the club face and the softness of the cover strongly influences the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates. The term "compression" utilized in the golf ball trade generally defines the overall deflection that a golf ball undergoes when subjected to a compressive load. For example, PGA compression indicates the amount of change in golf ball's shape upon striking.

In the past, PGA compression related to a scale of from 0 to 200 given to a golf ball. The lower the PGA compression value, the softer the feel of the ball upon striking. In practice, tournament quality balls have compression ratings around 70–110, preferably around 80 to 100.

In determining PGA compression using the 0–200 scale, a standard force is applied to the external surface of the ball. A ball which exhibits no deflection (0.0 inches in deflection) is rated 200 and a ball which deflects $2/10$th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200–100) and a ball which deflects 0.110 inches (110×0.001 inches) has a PGA compression of 90 (i.e., 200–110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable springloaded anvil. The dial indicator is mounted such that it measures the upward movement of the springloaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Philadelphia, Pa. to evaluate compression of the various components (i.e., cores, mantle cover balls, finished balls, etc.) of the golf balls. The Riehle compression device determines deformation in thousandths of an inch under a fixed initialized load of 200 pounds. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160—Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is know. These devices have been designed, such as a Whitney Tester, to correlate or correspond to PGA compression through a set relationship or formula.

Shore D Hardness

As used herein, "Shore D hardness" of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

Fillers

In a particularly preferred form of the invention, at least one layer of the golf ball contains at least 0.01 parts by weight of a filler. Fillers preferably are used to adjust the density, flex modulus, mold release, and/or melt flow index of a layer. More preferably, at least when the filler is for adjustment of density or flex modulus of a layer, it is present in an amount of at least five parts by weight based upon 100 parts by weight of the layer composition. With some fillers, up to about 200 parts by weight probably can be used.

A density adjusting filler according to the invention preferably is a filler which has a specific gravity which is at least 0.05 and more preferably at least 0.1 higher or lower than the specific gravity of the layer composition. Particularly preferred density adjusting fillers have specific gravities which are higher than the specific gravity of the resin composition by 0.2 or more, even more preferably by 2.0 or more.

A flex modulus adjusting filler according to the invention is a filler which, when used in an amount of e.g. 1–100 parts by weight based upon 100 parts by weight of resin composition, will raise or lower the flex modulus (ASTM D-790) of the resin composition by at least 1% and preferably at least 5% as compared to the flex modulus of the resin composition without the inclusion of the flex modulus adjusting filler.

A mold release adjusting filler is a filler which allows for the easier removal of a part from a mold, and eliminates or reduces the need for external release agents which otherwise could be applied to the mold. A mold release adjusting filler typically is used in an amount of up to about 2 wt % based upon the total weight of the layer.

A melt flow index adjusting filler is a filler which increases or decreases the melt flow, or ease of processing of the composition.

The layers may contain coupling agents that increase adhesion of materials within a particular layer e.g. to couple a filler to a resin composition, or between adjacent layers. Non-limiting examples of coupling agents include titanates, zirconates and silanes. Coupling agents typically are used in amounts of 0.1–2 wt % based upon the total weight of the composition in which the coupling agent is included.

A density adjusting filler is used to control the moment of inertia, and thus the initial spin rate of the ball and spin decay. The addition in one or more layers, and particularly in the outer cover layer of a filler with a lower specific gravity than the resin composition results in a decrease in moment of inertia and a higher initial spin rate than would result if no filler were used. The addition in one or more of the cover layers, and particularly in the outer cover layer of a filler with a higher specific gravity than the resin composition, results in an increase in moment of inertia and a lower initial spin rate. High specific gravity fillers are preferred as less volume is used to achieve the desired inner cover total weight. Nonreinforcing fillers are also preferred as they have minimal effect on COR. Preferably, the filler does not chemically react with the resin composition to a substantial degree, although some reaction may occur when, for example, zinc oxide is used in a shell layer which contains some ionomer.

The density-increasing fillers for use in the invention preferably have a specific gravity in the range of 1.0–20. The density-reducing fillers for use in the invention preferably have a specific gravity of 0.06–1.4, and more preferably 0.06–0.90. The flex modulus increasing fillers have a reinforcing or stiffening effect due to their morphology, their interaction with the resin, or their inherent physical properties. The flex modulus reducing fillers have an opposite effect due to their relatively flexible properties compared to the matrix resin. The melt flow index increasing fillers have a flow enhancing effect due to their relatively high melt flow versus the matrix. The melt flow index decreasing fillers have an opposite effect due to their relatively low melt flow index versus the matrix.

Fillers which may be employed in layers other than the outer cover layer may be or are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof. Non-limiting examples of suitable fillers, their densities, and their preferred uses are as follows:

TABLE 9

| Filler Type | Spec. Grav. | Comments |
|---|---|---|
| Precipitated hydrated silica | 2.0 | 1,2 |
| Clay | 2.62 | 1,2 |
| Talc | 2.85 | 1,2 |
| Asbestos | 2.5 | 1,2 |
| Glass fibers | 2.55 | 1,2 |
| Aramid fibers (KEVLAR ®) | 1.44 | 1,2 |
| Mica | 2.8 | 1,2 |
| Calcium metasilicate | 2.9 | 1,2 |
| Barium sulfate | 4.6 | 1,2 |
| Zinc sulfide | 4.1 | 1,2 |
| Lithopone | 4.2–4.3 | 1,2 |
| Silicates | 2.1 | 1,2 |
| Silicon carbide platelets | 3.18 | 1,2 |
| Silicon carbide whiskers | 3.2 | 1,2 |
| Tungsten carbide | 15.6 | 1 |
| Diatomaceous earth | 2.3 | 1,2 |
| Polyvinyl chloride | 1.41 | 1,2 |
| Carbonates | | |
| Calcium carbonate | 2.71 | 1,2 |
| Magnesium carbonate | 2.20 | 1,2 |
| Metals and Alloys (powders) | | |
| Titanium | 4.51 | 1 |
| Tungsten | 19.35 | 1 |
| Aluminum | 2.70 | 1 |
| Bismuth | 9.78 | 1 |
| Nickel | 8.90 | 1 |
| Molybdenum | 10.2 | 1 |
| Iron | 7.86 | 1 |
| Steel | 7.8–7.9 | 1 |
| Lead | 11.4 | 1,2 |
| Copper | 8.94 | 1 |
| Brass | 8.2–8.4 | 1 |
| Boron | 2.34 | 1 |
| Boron carbide whiskers | 2.52 | 1,2 |
| Bronze | 8.70–8.74 | 1 |
| Cobalt | 8.92 | 1 |
| Beryllium | 1.84 | 1 |
| Zinc | 7.14 | 1 |
| Tin | 7.31 | 1 |
| Metal Oxides | | |
| Zinc oxide | 5.57 | 1,2 |
| Iron oxide | 5.1 | 1,2 |
| Aluminum oxide | 4.0 | |
| Titanium oxide | 3.9–4.1 | 1,2 |
| Magnesium oxide | 3.3–3.5 | 1,2 |
| Zirconium oxide | 5.73 | 1,2 |
| Metal Stearates | | |
| Zinc stearate | 1.09 | 3,4 |
| Calcium stearate | 1.03 | 3,4 |
| Barium stearate | 1.23 | 3,4 |
| Lithium stearate | 1.01 | 3,4 |
| Magnesium stearate | 1.03 | 3,4 |
| Particulate carbonaceous materials | | |
| Graphite | 1.5–1.8 | 1,2 |
| Carbon black | 1.8 | 1,2 |
| Natural bitumen | 1.2–1.4 | 1,2 |
| Cotton flock | 1.3–1.4 | 1,2 |
| Cellulose flock | 1.15–1.5 | 1,2 |
| Leather fiber | 1.2–1.4 | 1,2 |
| Micro balloons | | |
| Glass | 0.15–1.1 | 1,2 |
| Ceramic | 0.2–0.7 | 1,2 |
| Fly ash | 0.6–0.8 | 1,2 |

TABLE 9-continued

| Filler Type | Spec. Grav. | Comments |
|---|---|---|
| Coupling Agents Adhesion Promoters | | |
| Titanates | 0.95–1.17 | |
| Zirconates | 0.92–1.11 | |
| Silane | 0.95–1.2 | |

COMMENTS:
1 Particularly useful for adjusting density of the cover layer.
2 Particularly useful for adjusting flex modulus of the cover layer.
3 Particularly useful for adjusting mold release of the cover layer.
4 Particularly useful for increasing melt flow index of the cover layer.

All fillers except for metal stearates would be expected to reduce the melt flow index of the cover layer.

The amount of filler employed is primarily a function of weight requirements and distribution.

The invention has been described with reference to the preferred embodiment. Obviously, modifications and alterations will occur to others upon reading and understanding the proceeding detailed description. It is intended that the invention be construed as including all such modifications and alterations insofar as they come within the scope of the appended claims or the equivalents thereof.

What is claimed is:

1. A method of producing a golf ball having a core, an inner cover layer disposed about the core, and an outer cover layer disposed on the inner cover layer, the method comprising the steps of:

selecting a first material for forming a golf ball core;

forming the golf ball core from the first material;

selecting a second material for use in forming an inner cover layer, the second material being thermoplastic;

forming an inner cover layer from the second material about the golf ball core the second material exhibiting a Shore D hardness of at least 60 as measured on the curved surface of the inner cover layer;

selecting a third material for use in forming an outer cover layer;

forming an outer cover layer from the third material about the inner cover layer the third material exhibiting a Shore D hardness of no more than 53 as measured on the curved surface of the outer cover layer;

wherein the selection of the first material, second material, and third material and the forming of the core, inner cover layer and outer cover layer are performed such that the golf ball exhibits a PGA compression of 100 or less and a coefficient of restitution of at least 0.750.

2. A method according to claim 1, wherein the third material is selected and formed about the inner cover layer such that it exhibits a Shore D hardness of no more than 50.

3. A method according to claim 1, wherein the selection of the first material, second material, and third material and the forming of the core, inner cover layer and outer cover layer are performed such that the golf ball exhibits a PGA compression of 90 or less.

4. A method according to claim 1, wherein material comprising ionomer is selected for at least one of the second material and the third material.

5. A method according to claim 4, wherein the second material has a flex modulus of greater than 30,000 psi.

6. A method of producing a golf ball having a core, an inner cover layer disposed about the core and an outer cover layer disposed on the inner cover layer, comprising the steps of:

selecting a first material for forming a golf ball core;

forming the golf ball core from the first material;

selecting a second material for use in forming an inner cover layer, the second material including at least 75 weight % of at least one material selected from the group consisting of polyphenylene ether/ionomer blends, ionomers, polyamides, polyurethanes, polyester elastomers, polyester amides, metallocene catalyzed polyolefins, and blends thereof;

forming an inner cover layer from the second material about the golf ball core;

selecting a third material for use in forming an outer cover layer;

forming an outer cover layer from the third material about the inner cover layer the third material exhibiting a Shore D hardness of no more than 53 as measured on the curved surface of the outer cover layer;

wherein the selection of the first, second and third materials and the forming of the core, inner cover layer and outer cover layer are performed such that the golf ball exhibits a PGA compression of 100 or less and a coefficient of restitution of at least 0.750.

7. A method according to claim 6, wherein the core is compression or injection molded from a slug or ribbon of uncured or lightly cured elastomer composition comprising a high cis content polybutadiene and a metal salt of an alpha, beta, ethylenically unsaturated carboxylic acid.

8. A method according to claim 6, wherein the golf ball is coated with a durable, abrasion-resistant, non-yellowing finish coat.

9. A method according to claim 6, wherein the core is wound, solid or liquid filled.

10. A method according to claim 6, wherein the inner cover layer is about 0.01 to about 0.10 inches in thickness and the outer cover layer is from about 0.01 to about 0.10 inches in thickness.

11. A method of producing a golf ball having a core, an inner cover layer disposed about the core and an outer cover layer disposed on the inner cover layer, comprising the steps of:

selecting a first material for forming a golf ball core;

forming the golf ball core from the first material;

selecting a second material for use in forming an inner cover layer, the second material being thermoplastic;

forming an inner cover layer from the second material about the golf ball core the second material exhibiting a Shore D hardness of at least 60 as measured on the curved surface of the inner cover layer;

selecting a third material for use in forming an outer cover layer, the third material exhibiting a flex modulus of from about 1,000 to about 10,000 psi;

forming an outer cover layer from the third material about the inner cover layer;

wherein the selection of the first, second and third materials and the forming of the core, inner cover layer and outer cover layer are performed such that the golf ball exhibits a PGA compression of 100 or less and a coefficient of restitution of at least 0.750.

12. A method according to claim 11, wherein the second material exhibits a flex modulus of at least 30,000 psi.

13. A method according to claim 11, wherein the core is compression or injection molded from a slug or ribbon of uncured or lightly cured elastomer composition comprising a high cis content polybutadiene and a metal salt of an alpha, beta, ethylenically unsatured carboxylic acid.

14. A method according to claim 13, wherein a free radical initiator is mixed with the core composition to promote cross-linking.

15. A method according to claim 11, wherein the golf ball is coated with a durable, abrasion-resistant, non-yellowing finish coat.

16. A method according to claim 11, wherein the inner cover layer is formed via injection molding at about 380° F. to 450° F. into two hemispherical shells which are then positioned around the core in a mold having the desired inner cover thickness and subjected to compression molding at 200° F. to 330° F. for about 2 to 10 minutes, followed by cooling to fuse the shells together to form a unitary intermediate ball.

17. A method according to claim 11, wherein the inner cover layer is injected directly around the core placed at the center of the intermediate ball mold for a period of time in a mold temperature of from about 50° F. to 100° F.

18. A method according to claim 11, wherein the core is wound, solid or liquid filled.

19. A method according to claim 11, wherein the inner cover layer is about 0.01 to about 0.10 inches in thickness and the outer cover layer is from about 0.01 to about 0.10 inches in thickness.

* * * * *